United States Patent [19]

Peraldi

[11] 4,122,431

[45] Oct. 24, 1978

[54] METHOD OF SEISMIC SURVEY

[75] Inventor: René Peraldi, Billere, France

[73] Assignee: Societe Nationale Elf Aquitaine (Production), Paris, France

[21] Appl. No.: 719,418

[22] Filed: Sep. 1, 1976

Related U.S. Application Data

[63] Continuation of Ser. No. 505,939, Sep. 13, 1974, abandoned.

[30] Foreign Application Priority Data

Sep. 14, 1973 [FR] France .................................. 73 33177
Aug. 27, 1974 [FR] France .................................. 74 29256

[51] Int. Cl.$^2$ ................................................ G01V 1/36
[52] U.S. Cl. ........................ 340/15.5 MC; 340/15.5 F
[58] Field of Search .......... 340/15 SF, 15 CP, 15 CF, 340/15 MC

[56] References Cited

U.S. PATENT DOCUMENTS

| 3,096,846 | 7/1963 | Savit et al. | 340/15.5 MC |
|---|---|---|---|
| 3,274,541 | 9/1966 | Embree | 340/15.5 F |
| 3,387,258 | 6/1968 | Goupillard et al. | 340/15.5 CF |
| 3,432,807 | 3/1969 | Lindsey | 340/15.5 CP |
| 3,454,876 | 7/1969 | Huang | 340/15.5 CF |
| 3,550,073 | 12/1970 | Foster et al. | 340/15.5 MC |
| 3,564,494 | 2/1971 | Frasier et al. | 340/15.5 MC |
| 3,719,924 | 3/1973 | Muir et al. | 340/15.5 MC |

FOREIGN PATENT DOCUMENTS 1,176,881  8/1964  Fed. Rep. of Germany ... 340/15.5 MC

OTHER PUBLICATIONS

"Diffractive Processing of Geophysical Data," Jackson, *Applied Optics*, vol. 4, p. 419, Apr. 1965.
"Applications of Detection and Estimation Theory to Large Seismic Array," Capon, *Proceedings of the IEEE*, vol. 58, No. 5, May 1970.

*Primary Examiner*—Howard A. Birmiel
*Attorney, Agent, or Firm*—Brisebois & Kruger

[57] ABSTRACT

Seismic surveying is conducted with an emission source and a multiplicity of aligned punctual receivers at the surface of the medium to be surveyed. Adjacent receivers are spaced apart a distance not greater than the maximum space frequency of the waves to be detected. The outputs of the receivers which include surface waves and organized noise are individually recorded for various positions of the receivers to form at least 100 seismic traces. A seismogram is formed from the traces and the seismogram is treated to remove space frequencies. In a variation, a multiplicity of punctual emission sources are used with a receiver.

30 Claims, 35 Drawing Figures

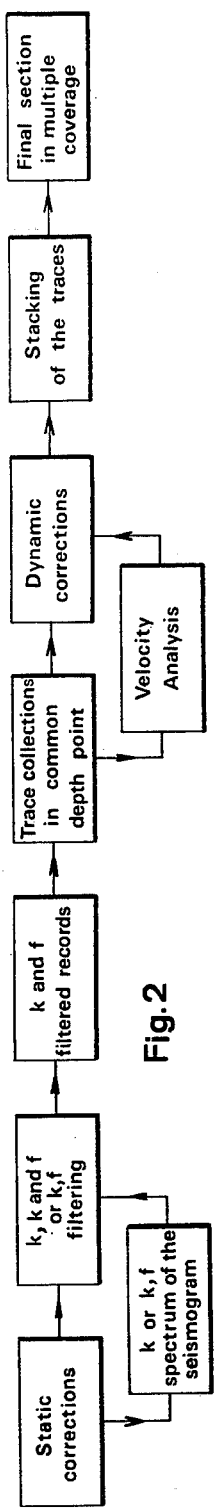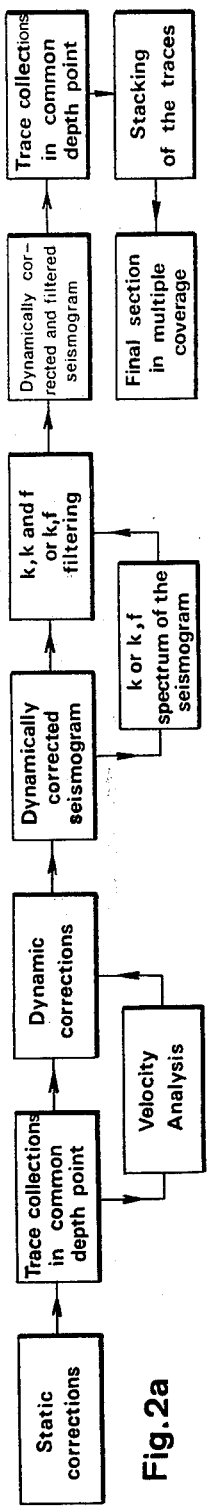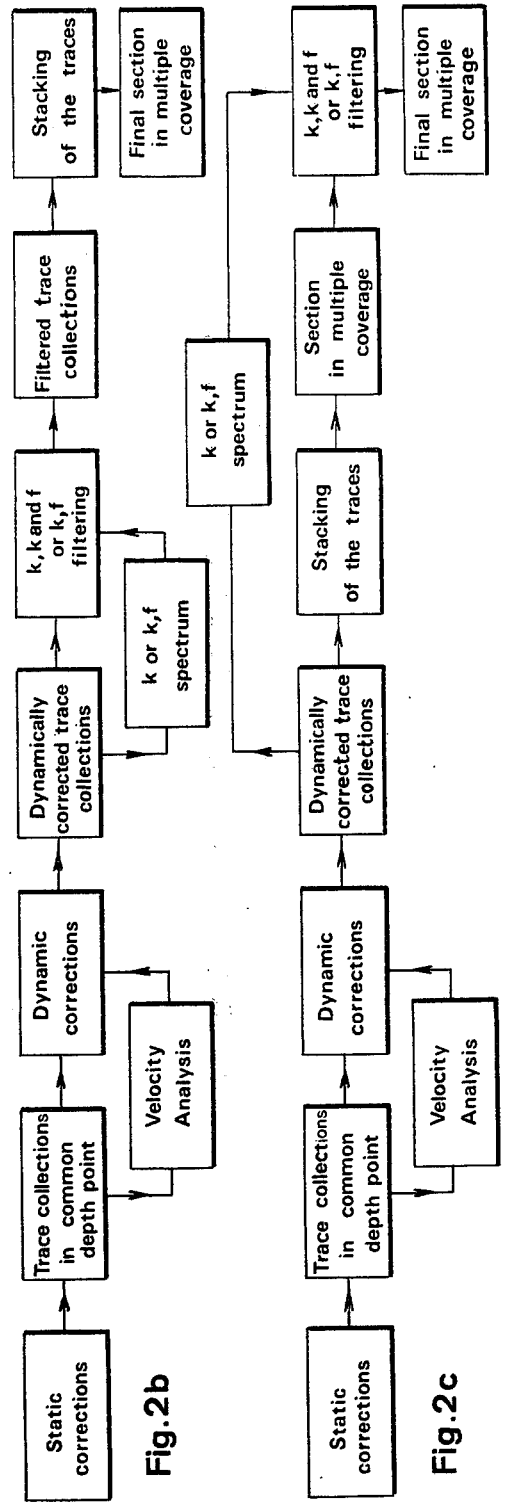

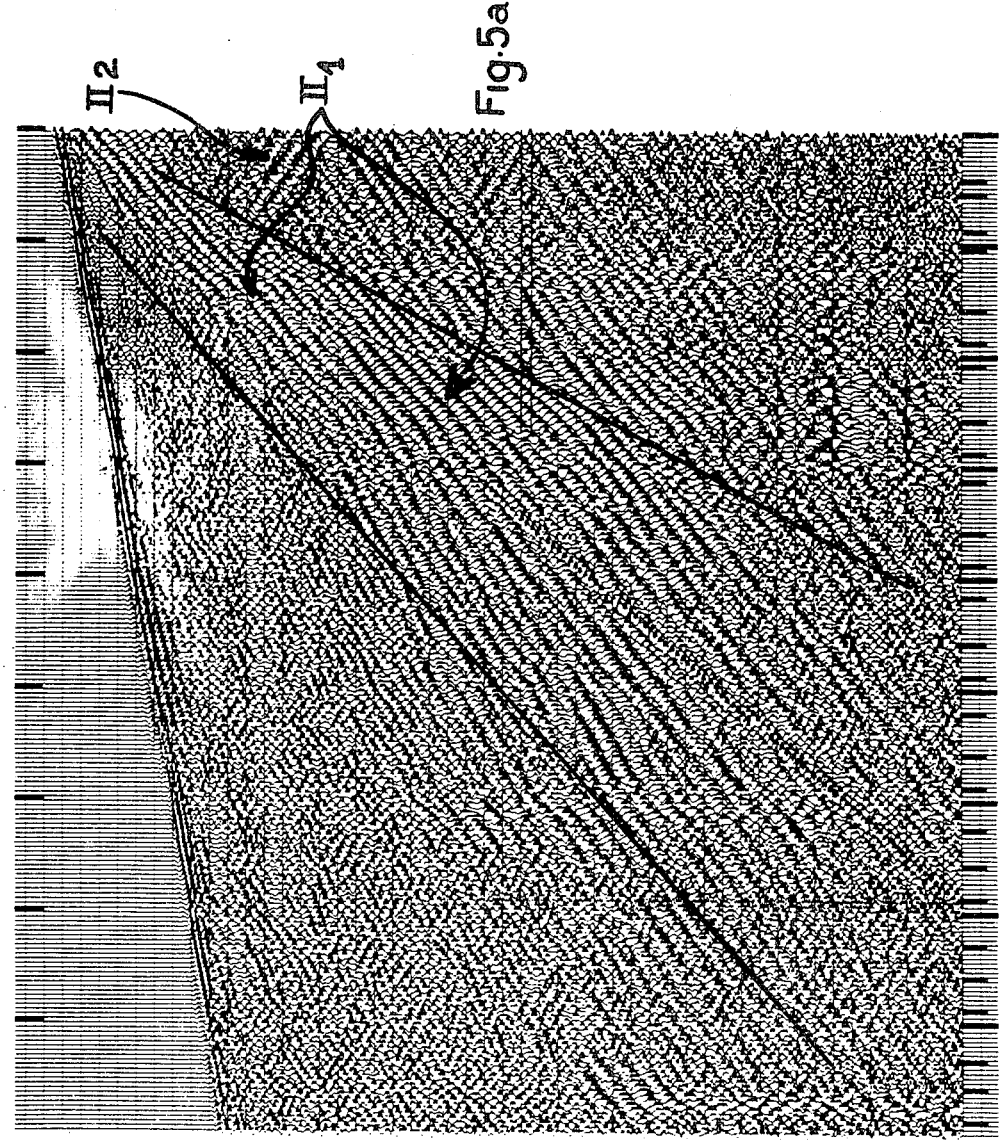

METHOD OF SEISMIC SURVEY

This is a continuation, of application Ser. No. 505,939, filed Sept. 13, 1974 now abandoned.

The instant invention relates to surveying or exploring a given medium by transmitting energy therethrough, and it relates more particularly to the geophysical survey, or prospection, of the sub-soil by means of seismic waves.

When an energy pulse is emitted from a point of the surface of the soil, or from a point adjacent to said surface, such point being called an "emission point," said pulse will generate elastic waves which are transmitted by the soil. A portion of the energy of said waves is reflected while another portion is refracted at each one of the geological discontinuities; this is indicated by variations of the acoustic impedance, whereby reflected or refracted waves are generated which can be detected by recording signals picked up by receiving devices such as geophones, said devices being arranged in one or more locations at the surface of the soil.

In known methods of seismic survey or exploration of this type, one or more spaced rows of receiving devices are associated with one emission point, and the output signals of said receiving devices are recorded simultaneously as a function of time; or a detector is associated with a plurality of aligned emission sources which are preferably arranged on a straight line passing through the detection point, or near the detection point, the signals resulting from the seismic pulses succesively created by each one of said emission sources being recorded successively.

The recordings corresponding to the different receiving devices have the shape of curves representing the variation of the amplitude as a function of time, said curves being called "seismic traces." Each one of said traces then undergoes a correction which is called "static correction," whereby the point of origin of time of each one of said traces is placed onto a reference plane; in other words, the emission point and the receiving points are then placed on said reference plane. The traces which have thus been corrected then undergo a transformation called "dynamic correction" which is carried out on the basis of the results of a survey of the respective velocities related to the depth. After the dynamic correction the recordings are juxtaposed so as to form a graph called "seismic time section" on the basis of which is established, if desired, a second graph called "seismic depth section," by applying a velocity law which is defined by an analysis of the velocities. The so-called "seismic depth section" graph represents the seismic section which may be interpreted; however in many cases the so-called "seismic time section" graph may also be used for interpretation.

Each one of the traces of the recording comprises on the one hand the signals corresponding to the reception of the waves reflected or refracted by the interfaces defined between different geological layers, and on the other hand signals corresponding to the noises, particularly to the superficial waves generated by the emission and called "organized noises" on account of their coherent nature.

The presence of these noises is particularly annoying as they may be superposed to the signals corresponding to the waves reflected or refracted by certain interfaces of the medium to be surveyed; said noises may even in certain cases mask entirely the above-mentioned signal. Consequently, it is necessary to eliminate, or at least to attenuate as far as possible said noises while preserving as far as possible said signals.

According to a known method of seismic survey or exploration of a given zone, the characteristic data (periodicity, frequency, apparent velocity, etc.) of the organized noises generated within said zone are previously determined by analysing a preliminary seismic recording obtained by the so-called "noise shot" method (a single emission point being associated to receiving devices which are regularly distributed, starting from the emission point and separated from each other by a small distance on the order of 5 to 10 meters, the recordings of said reception devices being taken indepently), then theoretically deducing from the characteristic data thus obtained the emission and/or receiving devices (group of emitters or receivers) which should be used to allow optimum attenuation of these noises to be achieved, and using during the survey operation, emission and receiving devices which correspond to the above-mentioned theoretically determined devices.

This known method presents a great number of disadvantages which decrease substantially the practical usefulness of such methods. Indeed, the above-mentioned preliminary noise-shots initiating the exploration operations and the analysis of the results obtained cannot be carried out for all the successive emission points, because this would not be economically justifiable. Furthermore, even though these analysis might be carried out, the effective response curves of the emission and receiving devices used on the soil for attenuating the organized noises would substantially differ from the theoretical response curves chosen on the basis of the "noise shot" analysis, particularly on account of the fact that a) the identity of the various sources, on the one hand, and of the receivers, on the other hand (which constitute the emitting and receiving devices, respectively) cannot be established in an absolutely rigorous manner; b) the location of said devices cannot always guarantee an identical coupling to the soil, and c) the surface conditions (and consequently the characteristics of the generated surface noise) vary to a more or less considerable extent between the various points of the zone being surveyed, during the surveying operations, and consequently the attenuation of the organized noise remains insufficient.

It is an object of the instant invention to provide an improved method of seismic survey of a medium, comprising emitting mechanic waves in said medium, receiving and recording the resulting reflected and/or refracted waves so as to establish a seismogram, and treating said seismogram to elaborate the seismic section, said method permitting determination for each detection point, the influence on the seismic trace of the organized noises or of other undesirable phenomena, whereby said noises and other undesirable phenomena may be attenuated and the disadvantages of the above-mentioned methods may be eliminated.

More particularly, it is an object of the instant invention to provide a method of seismic survey of a given medium, comprising emitting mechanical waves in said medium, detecting at at least one point of the surface of said medium the reflected and/or refracted waves, and recording signals representing the variations of the amplitude of the thus detected waves as a function of time, in the form of a seismogram constituted by a plurality of seismic traces, in which method said seismogram contains a statistically great number of seismic traces, the interval between any two consecutive traces corresponding to a distance on the soil which is not greater than the inverse of twice the maximum space frequency of the recorded waves, and wherein the treatment of said seismogram with a view to establish a seismic section comprises carrying out an analysis of the characteristic data of the space frequencies of said seismogram; said method further comprising submitting said seismogram to a filtering operation for eliminating from said space frequencies the frequencies corresponding to parasitic phenomena, especially the frequencies corresponding to organized noises, such parasitic phenomena having been determined by said analysis.

The seismogram containing a statistically great number of traces may be obtained by associating elementary seismograms comprising a statistically great number or a small number of traces if the distance between adjacent traces corresponds to a condition according to which the distance on the soil is smaller than the inverse of twice the maximum space frequency of the recorded waves.

The seismogram comprising a statistically great number of traces may also be obtained by operating directly on the soil, in accordance with one embodiment of the instant invention, which comprises arranging on the surface of the medium to be surveyed or in the vicinity of said surface a plurality of substantially punctual, mutually aligned receiving devices associated with a single emission source, or a plurality of substantially punctual, mutually aligned emission sources associated with a single receiving device, said plurality of receiving devices or plurality of emission sources comprising a statistically great number of receiving devices or of emission sources which are spaced in such a manner that the distance between any two adjacent receiving devices or any two adjacent emission sources is not greater than the inverse of twice the maximum space frequency (wave number) of the recorded waves, and emitting from the emission source or sources successive energy pulses while recording independently and simultaneously the signals detected by the plurality of receiving devices associated to the single emission source, or recording successively the signals corresponding to the plurality of emission sources associated to the single emission device, so as to produce said seismogram.

In this embodiment the straight line on which the receiving devices or the emission sources are aligned, passes through, or at the vicinity of, the single associated emission point or detection point.

In a particular embodiment of the instant invention the seismogram containing a statistically great number of traces or elementary seismograms adapted to be associated with each other so as to constitute said seismogram, result from the combination of recordings which comprise an equal number of traces and are obtained by effecting a plurality of consecutive emission cycles in accordance with the so-called "multiple coverage" technique.

When carrying out this particular embodiment of the invention it is possible to obtain as a supplementary advantage a substantial attenuation of the random noises and the multiple reflections.

The analysis of the space frequency characteristics of the seismogram comprising a statistically great number of traces is carried out advantageously by determining the spectres of space frequence or space-time frequencies of the seismogram and by analyzing said spectres, said determination being carried out preferably after the traces of said seismogram have been submitted to the usual corrections known per se which are called "static corrections."

The filtering of a seismogram with a view to eliminating from its space frequencies or its space-time frequencies the frequencies corresponding to parasitic and other undesirable phenomena may be carried out prior to the known treatments (static corrections, velocity analysis and dynamic corrections, etc.), which are usually effected with a view to elaborating the seismic section; said filtering may also be carried out during said treatments, or after said treatments have been effected.

Thus, in the field of seismic reflection survey it is possible to determine the space frequency or space-time frequency spectres of the seismogram and to carry out the filtering, or filterings, related to the space frequency or space-time frequencies, on the seismic sections or the trace collections in common depth point which have undergone the dynamic corrections, and even on the seismic section in multiple coverage obtained on the basis of said collections of dynamically corrected traces.

In one embodiment of the method according to the present invention the filtering related to the space frequencies is effected on the seismogram which has undergone the static corrections and possibly the dynamic corrections, by sampling the amplitudes of the traces of said seismogram according to a predetermined time sampling pitch and by establishing for each value of the sampling times a function representing the sampled amplitudes for all the traces, as a function of the spatial position of said traces (corresponding to the spatial position of the reception points associated to a single emission point, or to the emission points associated with a single reception point), then determining the space frequency spectre of each one of said functions, and filtering said functions so as with eliminate from said spectres the space frequencies which correspond to parasitic or other undesirable phenomena; and finally restituting from the thus treated functions the time traces (corresponding to the various spatial positions of the receiving points or emitting points) with a view to re-form the seismogram which is then submitted with the known treatments so as to provide the seismic section.

According to another embodiment of the instant invention, the filterings related to the spatial frequencies are effected on the seismogram which has undergone the static corrections and possibly the dynamic corrections, by sampling the amplitudes of the traces of said seismogram (corresponding to the various receiving or emitting points) according to a predetermined sampling interval and establishing for sampling time values which vary with the spatial position of the traces (corresponding to the spatial position of the receiving points or emission points) in accordance with a predetermined law, a function representing the series of amplitudes sampled for all the traces, then determining the spectre of the space-time frequencies of said functions, and filtering said functions so as to eliminate from said spectres those space-time frequencies which correspond to parasitic or other undesirable phenomena, and finally re-establishing on the basis of the thus treated functions the time traces (corresponding to the various spatial positions of the receiving or emitting points) so as to re-form the seismogram which is then submitted to complementary treatments with a view to providing the seismic section.

The parasitic frequencies contained in the entirety of the space frequencies of the seismogram, and more particularly in the entirety of the space frequencies of the functions representing for each given time the amplitudes of the seismic traces as a function of the respective spatial positions (i.e. as a function of the spatial position of the receiving points associated to a single emission point, or as a function of the spatial position of the emission points associated to a single receiving point) are eliminated as indicated hereinabove by space filtering, which is also called "wave number filtering" or "$k$-filtering" ($k$ representing the wave number of a space wave and being defined as the inverse of the wave length of said wave).

The wave number filtering may be associated also to a frequency filtering (or time filtering) which is usually applied to the time traces of the seismograms, said frequency filtering being effected before or after the wave number filtering of the seismogram.

It is also possible to submit the seismogram to a combined space-time filtering by using the so-called "fan-filtering," or by using methods of directional space-time filtering limited to the region of the parasitic phenomena; these methods, which are numerical methods, are advantageously applied to the filtering of functions representing the series of the sampled amplitudes for the entirety of the traces at sampling times which vary with the spatial position of said traces in accordance with a given linear or non-linear law or function.

The space filtering, or space-time filtering may be of the "low-pass," "high-pass" or "band-pass" type, or they may be filterings of these various types varying as a function of space, or as a function of space and time. The said filtering operations may be effected by any known method, and, more particularly, by any known filtering method involving numerical treatment.

In accordance with the present invention, two seismograms may be established each of which contains a statistically great number of traces, the intertrace interval on each seismogram being not greater than the inverse of twice the maximal space frequency of the recorded waves and corresponding to two exploration directions which define a predetermined angle, especially an angle of 90°, whereafter said seismograms are treated separately so as to provide two seismic sections, each of which is located in the vertical plane passing through the corresponding exploration direction, the depth points corresponding to the minimum duration path being then located in the space by their respective co-ordinates in the system of axes formed by said directions and by the vertical axis perpendicular to the same, while utilizing information provided by said seismic sections.

In this embodiment of the method according to the instant invention the two seismograms may be obtained by using a punctual emission source associated to two rows of receiving devices, each of which rows, comprises a statistically great number of receiving devices which are substantially of a punctual nature, the distance between any two adjacent receiving devices being not greater than the inverse of twice the maximum space frequency of the recorded waves, the respective directions of the rows of receiving devices passing through the emission point and defining a predetermined angle which is preferably an angle of 90°, said directions constituting the above-mentioned exploration directions.

It is also possible to obtain the two seismograms by using one single punctual receiving device associated to two rows of emission sources wherein each row comprises a statistically great number of substantially punctual emission sources; the distance between any two adjacent emission sources being not greater than the inverse of twice the maximum space frequency of the recorded waves, while the directions of the rows of emission sources pass through the receiving point and define a predetermined angle, preferably a right angle, said directions constituting the above-mentioned exploration directions.

In the present description and the appended claims, the term "substantially punctual receiving point" (or receiving device) or "substantially punctual emission source" designates a single receiving point or device, or a single emission source, or a plurality of receiving points or devices, or a plurality of emission sources which practically achieve no space filtering on the soil.

If a slight space filtering appears to be necessary on the soil during the recording of too high a ratio of the amplitude of the organized noise to the amplitude of the useful signal, such a filtering may be effected on the soil, either at the emission (which is the preferred method) by selecting appropriate emission devices in case a plurality of receivers are used, or at the reception by selecting appropriate receiving devices in case a plurality of emission sources are used.

As set forth hereinabove, the plurality of traces used in accordance with the instant invention for establishing the seismogram which is submitted to space filtering during the treatments for elaborating the seismic section, must comprise a statistically great number of traces, i.e. a number of traces which allows during the phase of filtering of the seismogram in the zone of the space frequencies the statistic laws for treating the recorded space data to be applied, and to permit more particularly, a filtering the operator of which has a length compatible with the desired result. It should be pointed out that the hypothesis of ergodism necessary to guarantee the validity of the treatments of a common type applied to time traces, which hypothesis is not satisfied in a rigorous manner, needs not be satisfied as far as the treatment of the space data obtained according to the present invention is concerned.

The statistically great number of traces necessary for constituting the seismogram which is submitted to space filtering must at least be on the order of about 50. It is possible to obtain valuable results when said seismogram contains about 100 seismic traces. However, the results are improved, as said number of traces increases, and it is envisaged in accordance with the instant invention to utilize a number of traces as high as 250 or 500 for establishing said seismogram; said number may be as high as about 1000 or even higher, for instance, several thousands.

When the seismogram submitted to space filtering is obtained by direct recording on the soil, it is consequently necessary to utilize a plurality of substantially punctual receiving devices associated with a single emission source or a plurality of emission sources associated with a single receiving device, said arrangement comprising at least about 50 receiving devices or at least 50 emission sources.

When using about 100 receiving devices or emission sources with a view to establishing the above-mentioned traces satisfactory results may already be obtained. However, the results are improved as the number of punctual receiving devices associated with a single emission source or the number of punctual emission sources associated with a single receiver is increased; in accordance with the present invention it is envisaged to utilize as many as 250 or 500 receiving devices associated to a single emission source or a similar number of emission sources associated to a single receiving device; it is even possible to utilise a far greater number of receiving devices or emission sources; said number may be on the order of 1000 or several thousands.

In a greater number of practical applications the maximum space frequency of the recorded waves is on the order of 50 km$^{-1}$, or even higher, and the distance between any two adjacent receiving devices of a plurality of devices associated to a single emission source, or the distance between any two adjacent emission sources of a plurality of emission sources associated with a single receiving device, is then smaller than or equal to 10m.

When the survey method in accordance with the instant invention is utilized for seismic refraction survey, it is possible, during the treatment with a view to eliminating the space frequency corresponding to parasitic phenomena, to eliminate the first refracted waves after their exploitation and to render consequently possible the exploitation of the refracted waves arriving in the second place. This can be effected by detecting on the spectral wave number analysis (spectral $k$ analysis) of the refraction seismogram the successive arrivals of the wave numbers corresponding to the refracted waves arriving in the first place and then, after exploiting the same, by effecting a wave number filtering of said seismogram with a view to eliminating from the space frequency spectre of said seismogram the wave numbers corresponding to said refracted waves which arrive in the first place.

The survey method of the instant invention also allows for effecting the analysis in the spatial domain, whereas such analysis was effected up to now only in the temporal domain.

To this end it is possible, for instance, to carry out the spectral analysis of the space traces obtained from the basic recording, prior to any dynamic correction and while applying increasing dynamic data, and to take into account the velocities for which the amplitude spectres of the corrected space traces show a trend to form cardinal sinus which is offset with respect to the origin point. In this case the abscissa of the maximum of the amplitude spectre indicates the inclination of the mirror or depth point, with respect to the horizontal.

It is also possible to effect the spectral analysis on the traces of the spatial domain obtained on the basis of the collections in common depth point traces, when the number of coverage data is statistically sufficiently high, and to take into account the velocities for which the amplitude spectres of the corrected traces of the trace collection tends to form a cardinal sinus centered with respect to the origin point.

The number of coverage data is defined by the number of obtained traces relative to a common depth point during the exploitation, or by the number of consecutive recordings which comprise traces relative to common depth points.

The emission sources which may be used in the method according to the instant invention may be of any type of the known seismic sources. It is possible, for instance, to use burried explosive charges or explosive charges arranged at the surface of the soil, or any other type of sources commonly designated as "surface sources," such as vibrators, very heavy loads which are dropped on the surface of the soil, etc.

Similarly, as far as the receiving devices are concerned, any receiving device known per se may be used with a view to constituting the above mentioned plurality of punctual receiving devices in accordance with the instant invention.

Other objects and advantages of the instant invention will become apparent from the detailed description hereinafter which relates substantially to two embodiments which are given by way of example, but which are by no means to be construed as limiting the scope of the instant invention, said embodiments being illustrated by the appended drawings wherein.

Figure 1:
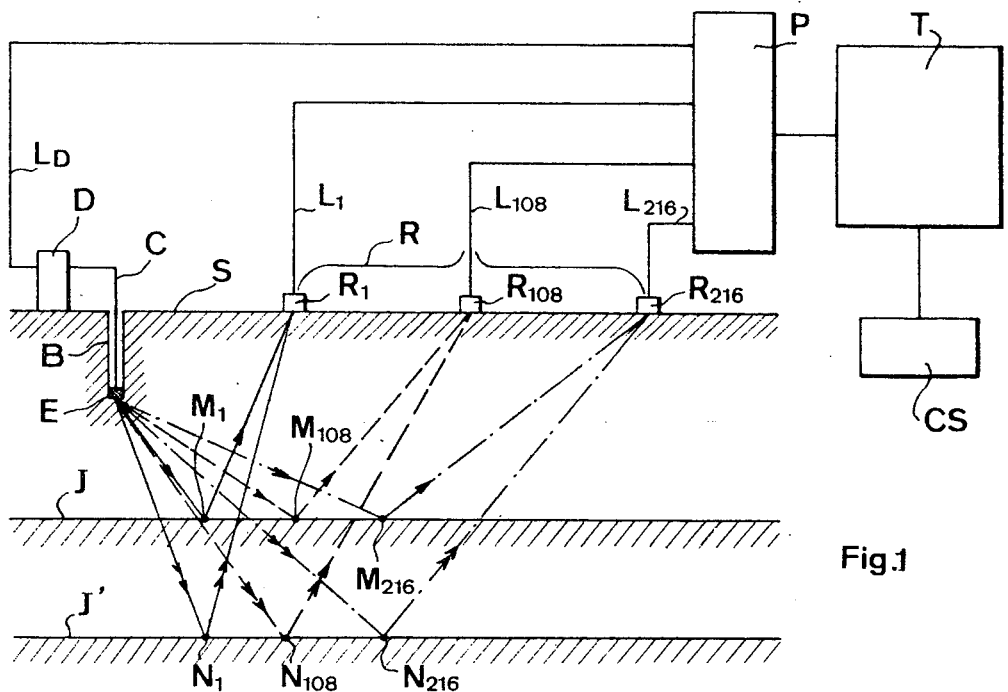
FIG. 1 is a schematic view of a zone of the soil and indicates the respective locations of a punctual emission source associated to a series of 216 receiving devices, or seismographs, said figure also showing the path of the seismic waves from the emission point to certain receiving devices, after reflection by certain reflecting points of the sub-soil of the above-mentioned zone.
Figure 3:
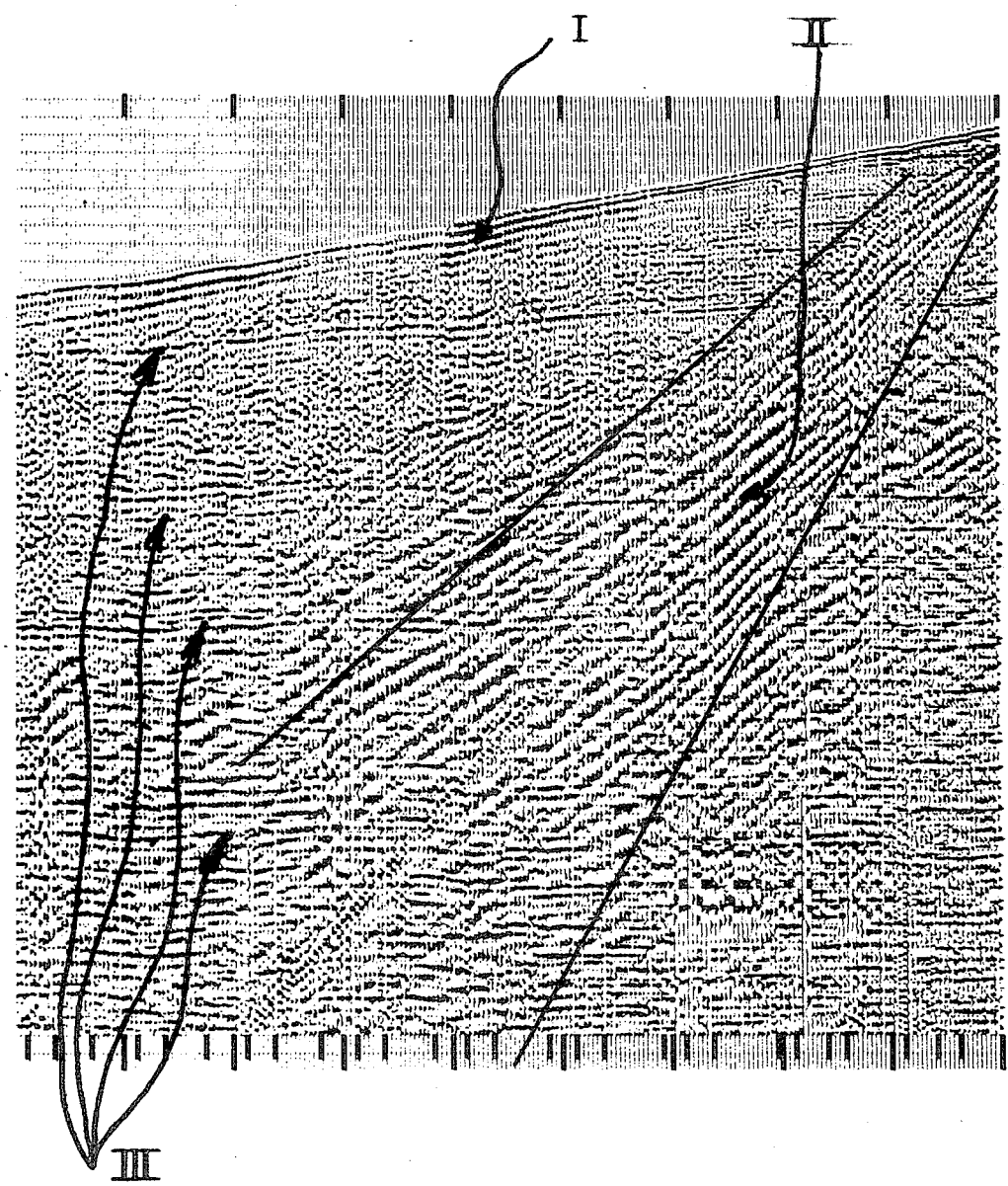
Figure 3A:
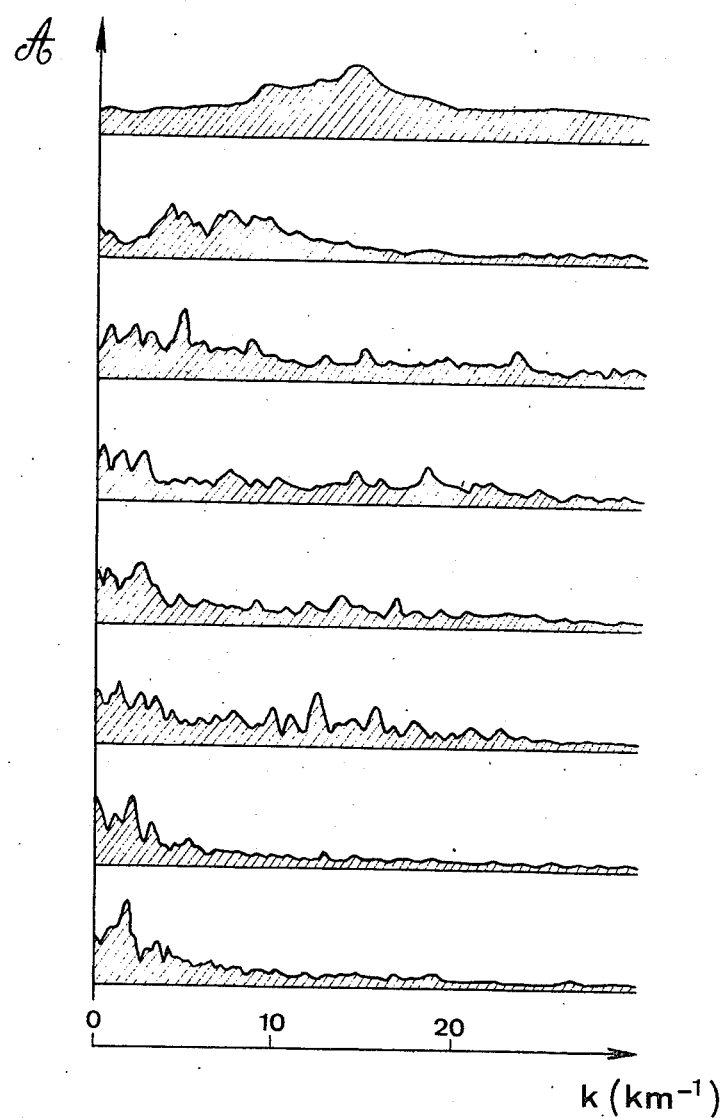
Figure 3B:
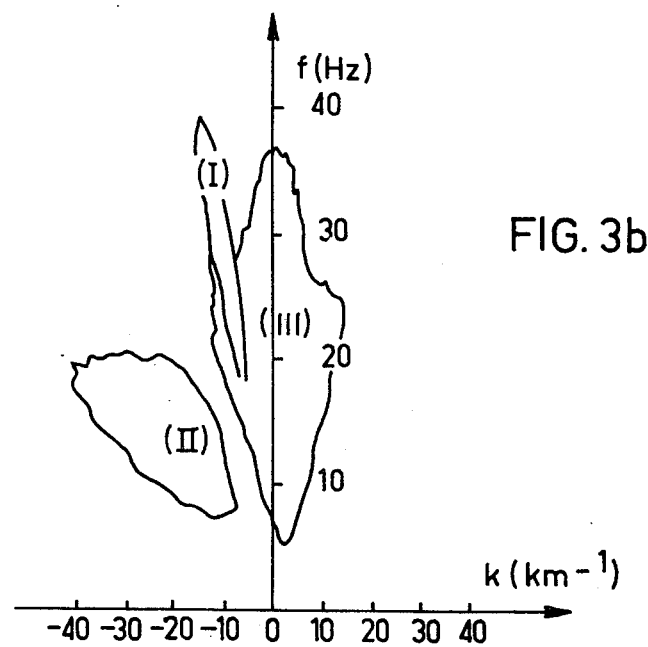

FIGS. 3, 3a and 3b, respectively, show a basic seismogram obtained by the recorder of the device of FIG. 1, and the space frequency and space time frequency spectres ($k$ and $k, f$ spectres, respectively) of said seismogram.

Figure 4A:
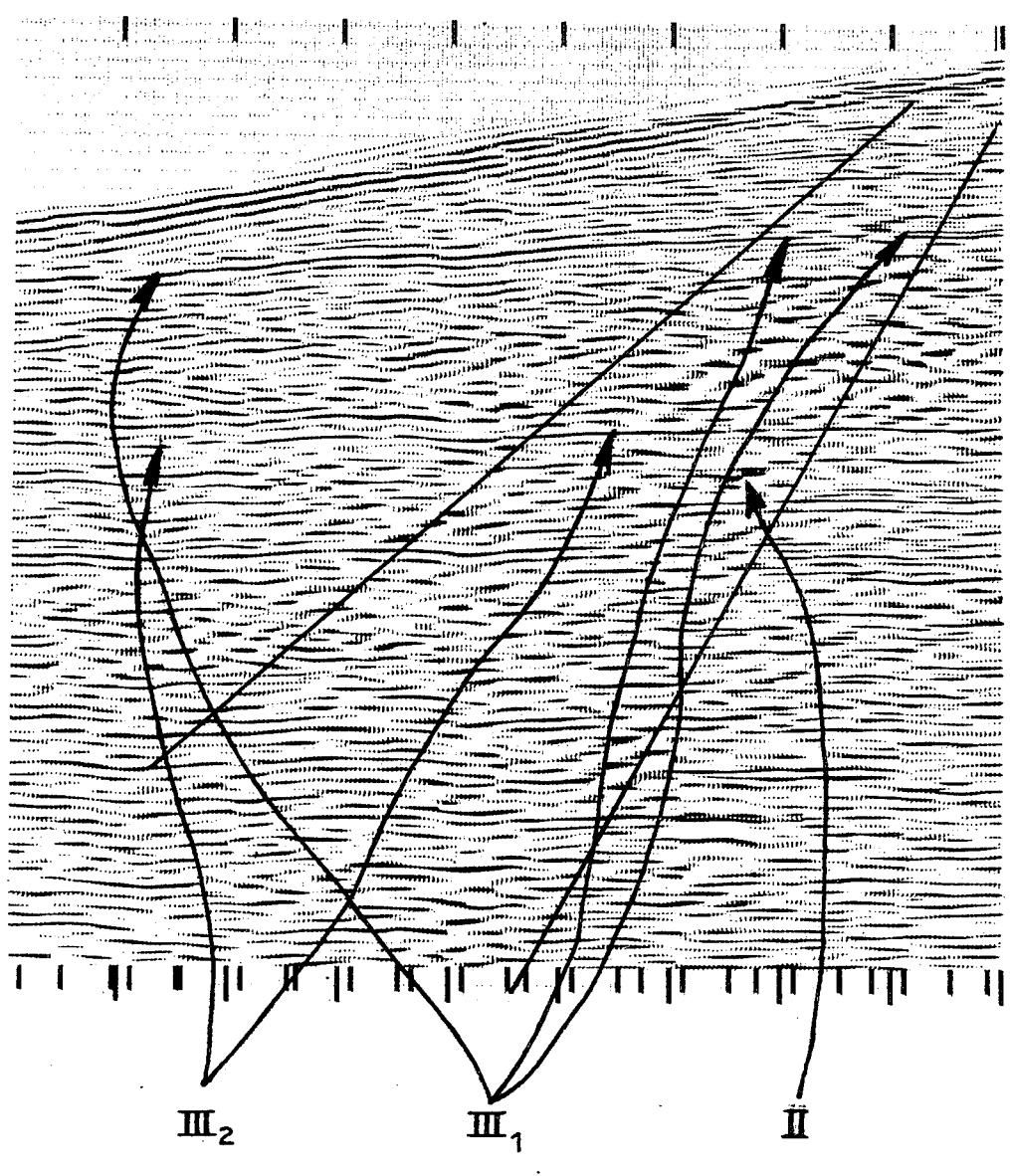
Figure 4B:
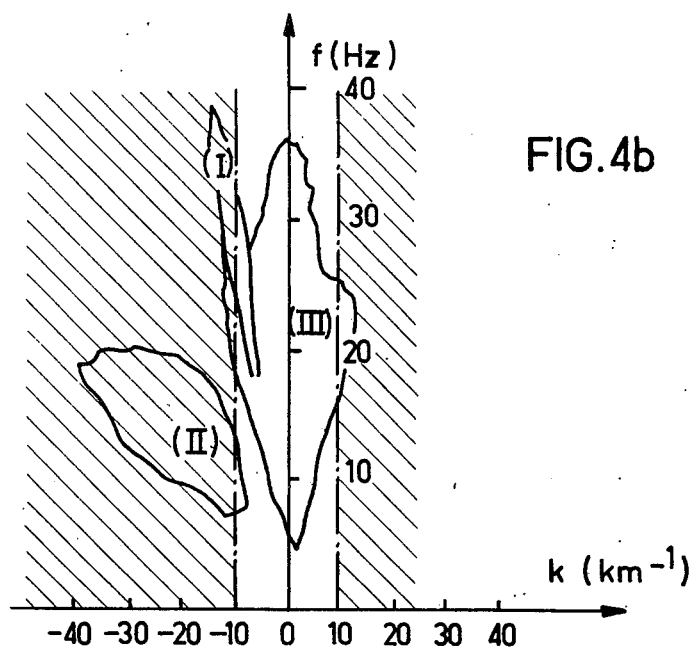
Figure 4D:
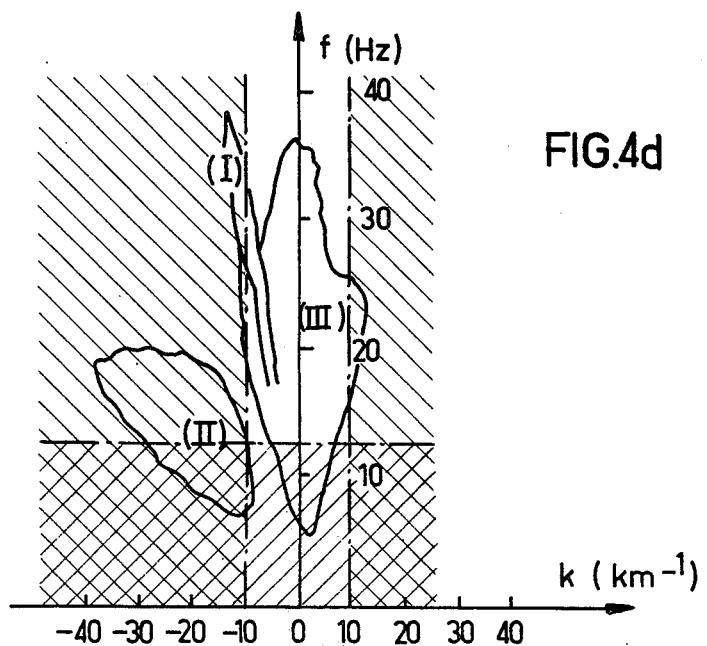
Figure 4C:
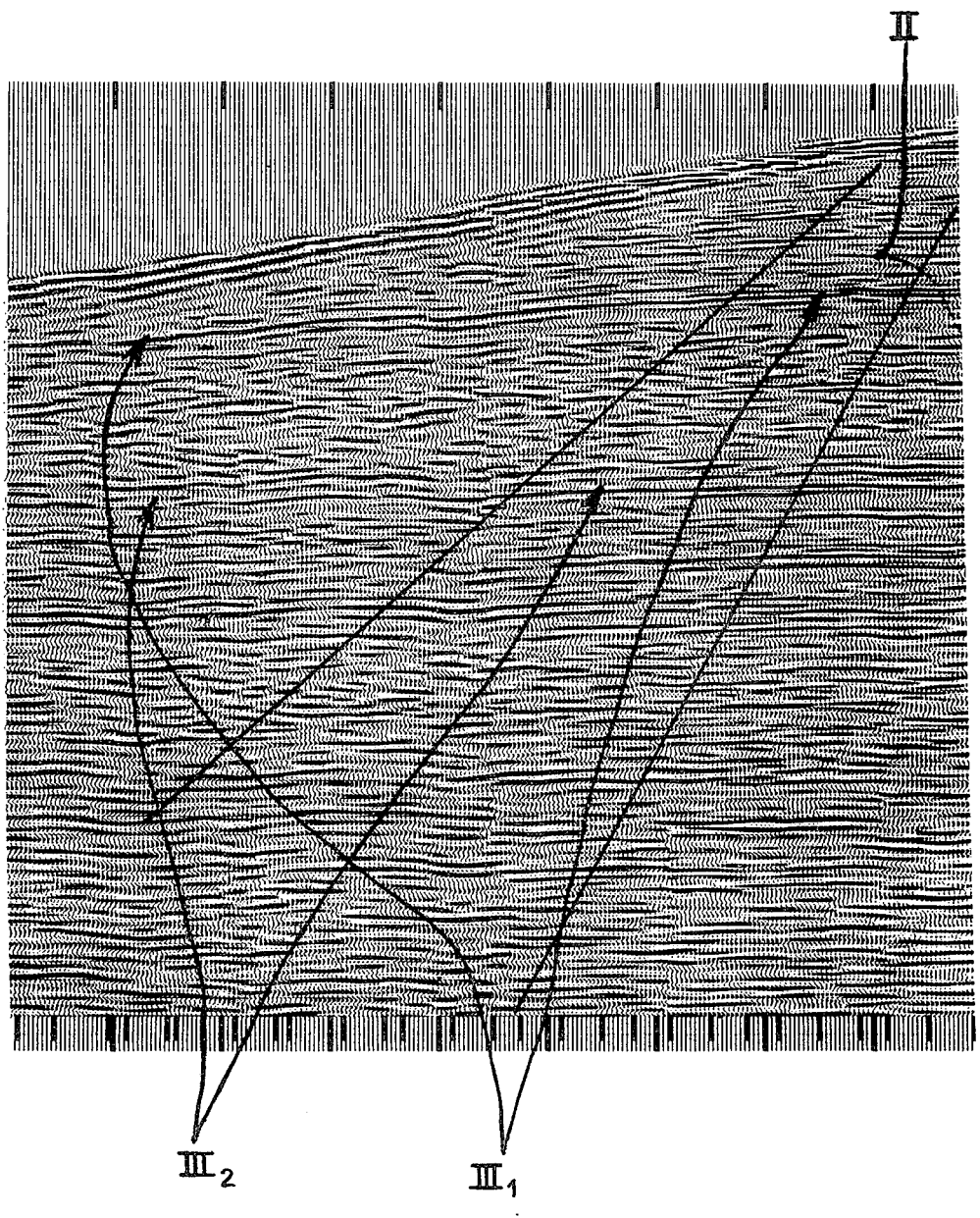
Figure 4E:
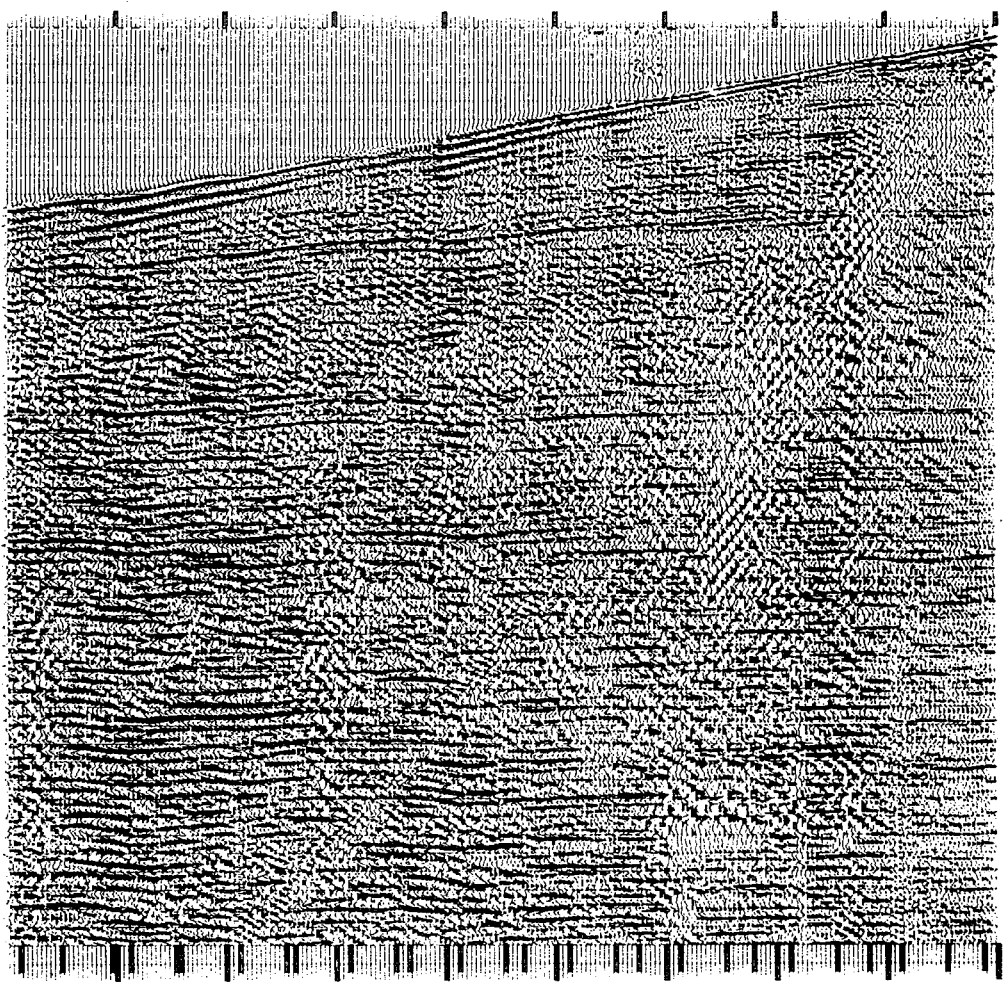
Figure 4F:
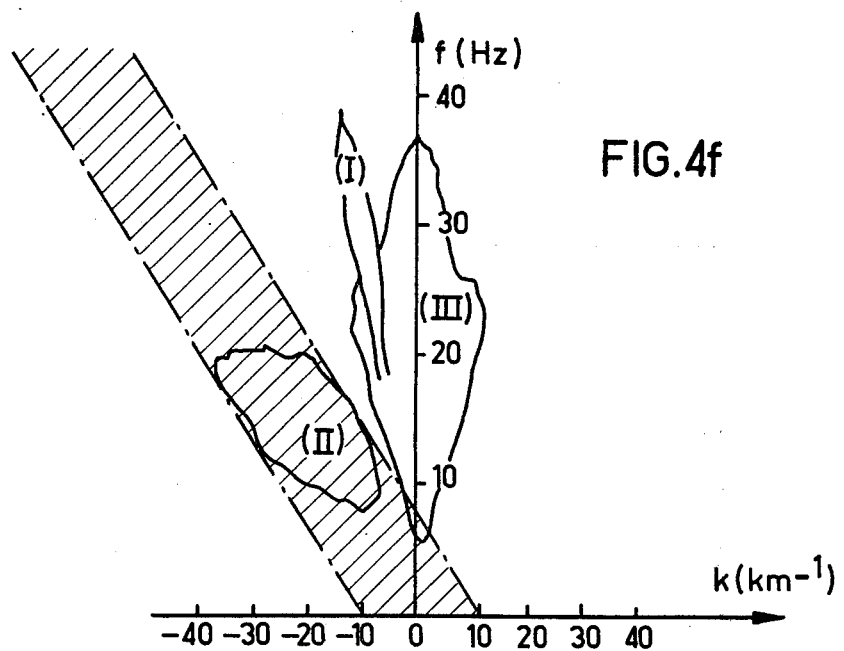

FIGS. 4a, 4c and 4e show, respectively, the recordings obtained after space filtering or $k$ filtering (method according to FIG. 2d), $k$ and $f$ filtering (method according to FIG. 2e) and $k, f$ filtering (method according to FIG. 2g) of the seismogram shown in FIG. 3, said filterings being effected as shown in FIGS. 4b, 4d and 4f with a view to attenuating the original noises.

Figure 5F:
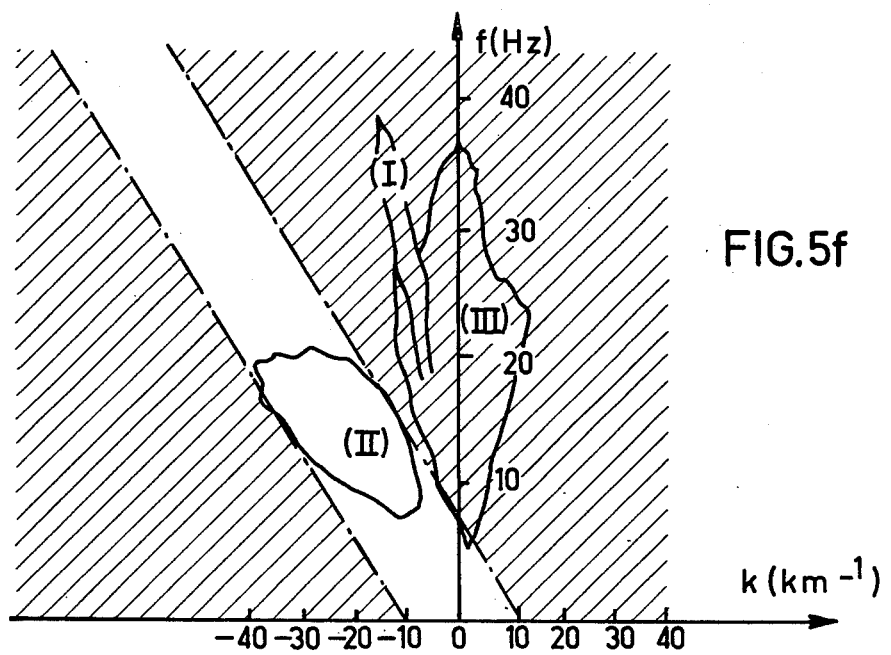
Figure 5B:
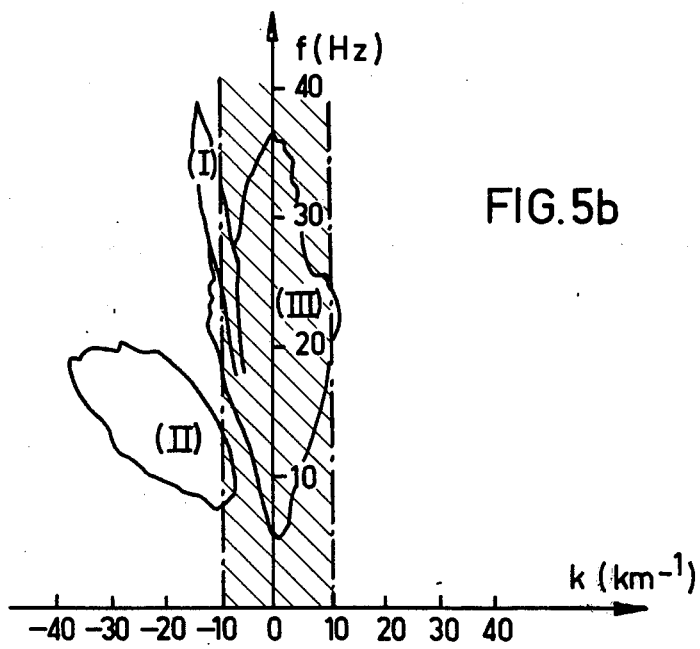
Figure 5D:
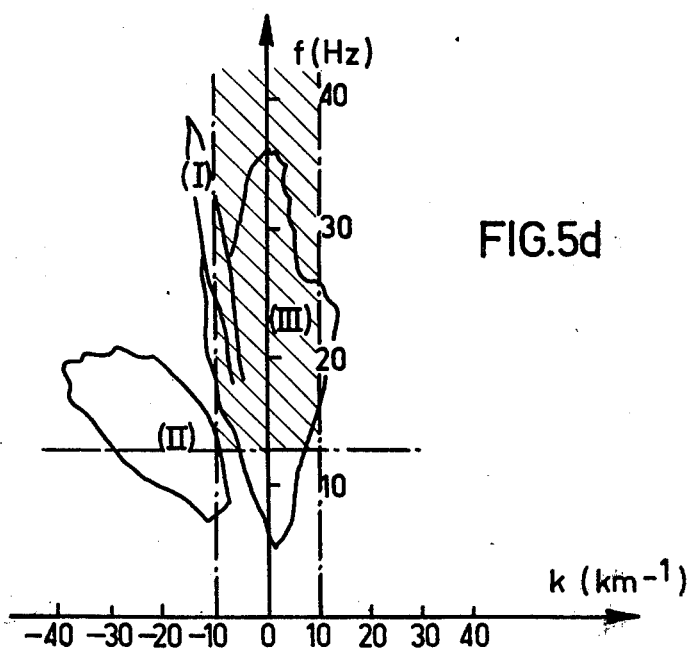
Figure 5C:
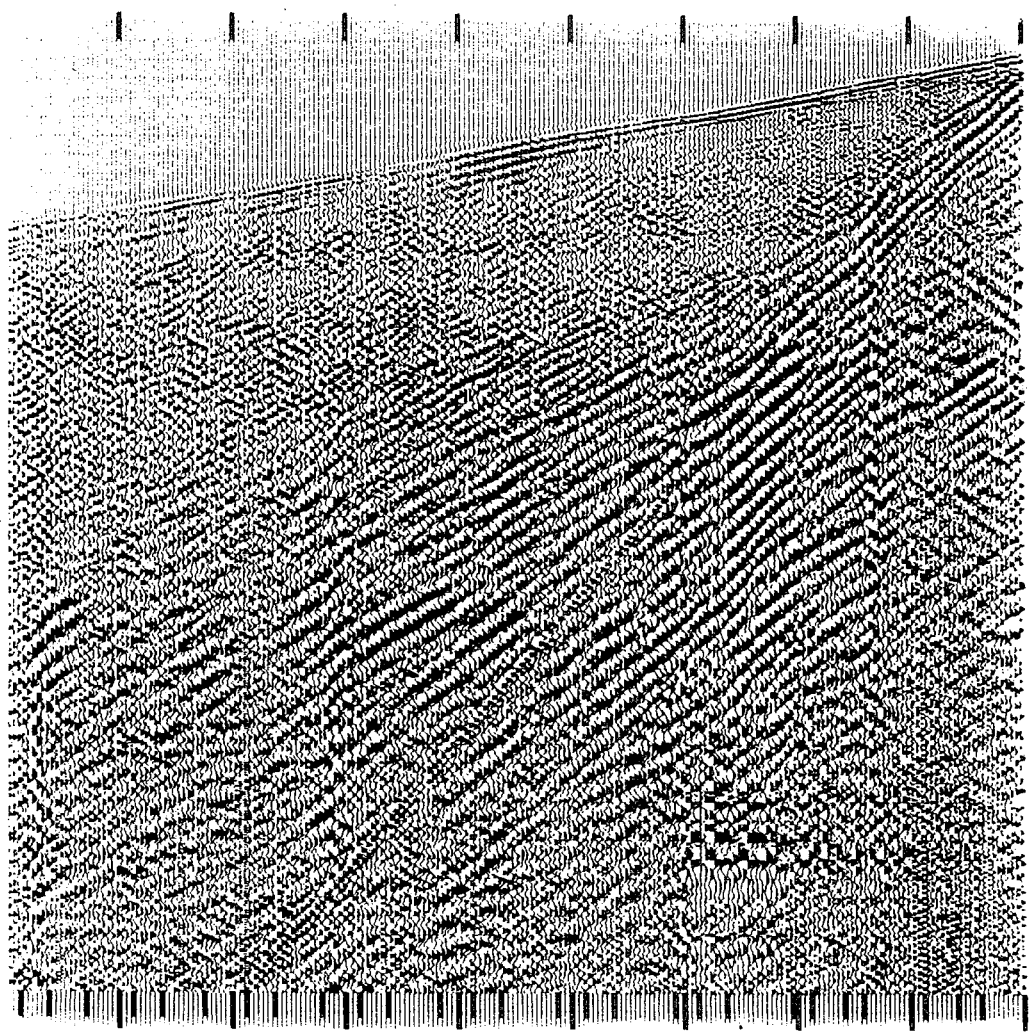
Figure 5E:
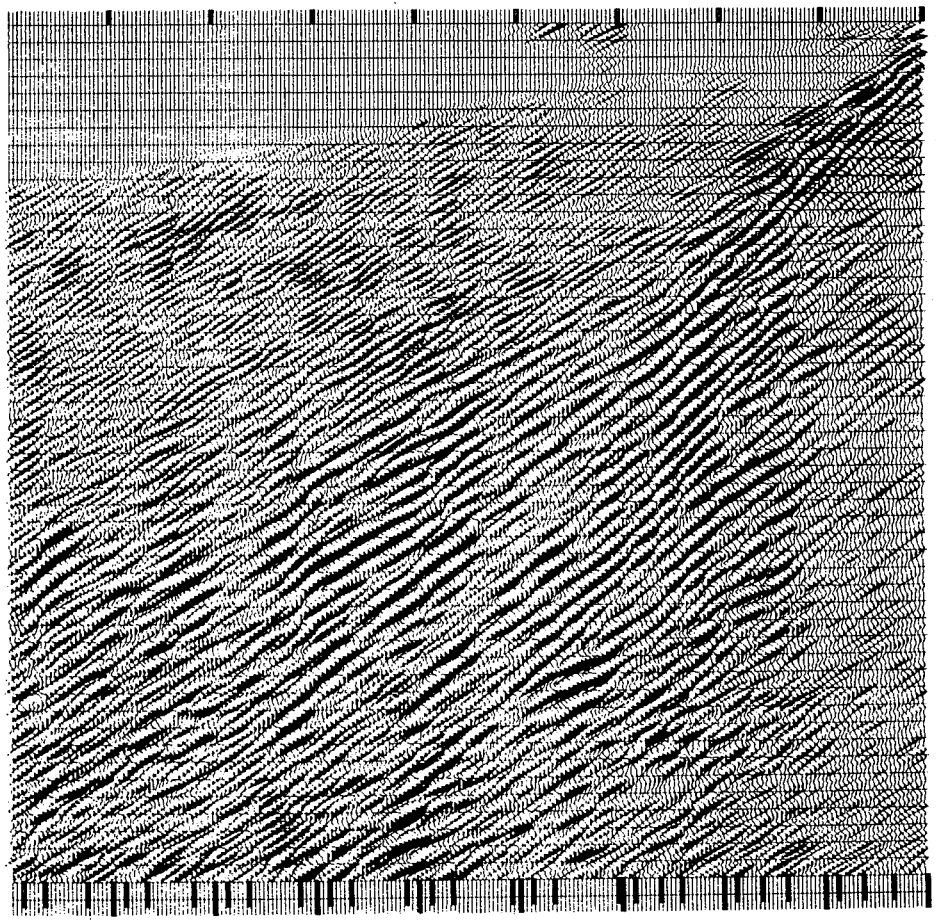

FIGS. 5a, 5c and 5e show the effects of the filters illustrated in FIGS. 5b, 5d and 5f which are, respectively, complementary to the previously used filters, i.e which represent the noises filtered according to FIGS. 4a, 4c and 4e.

Figure 6A:
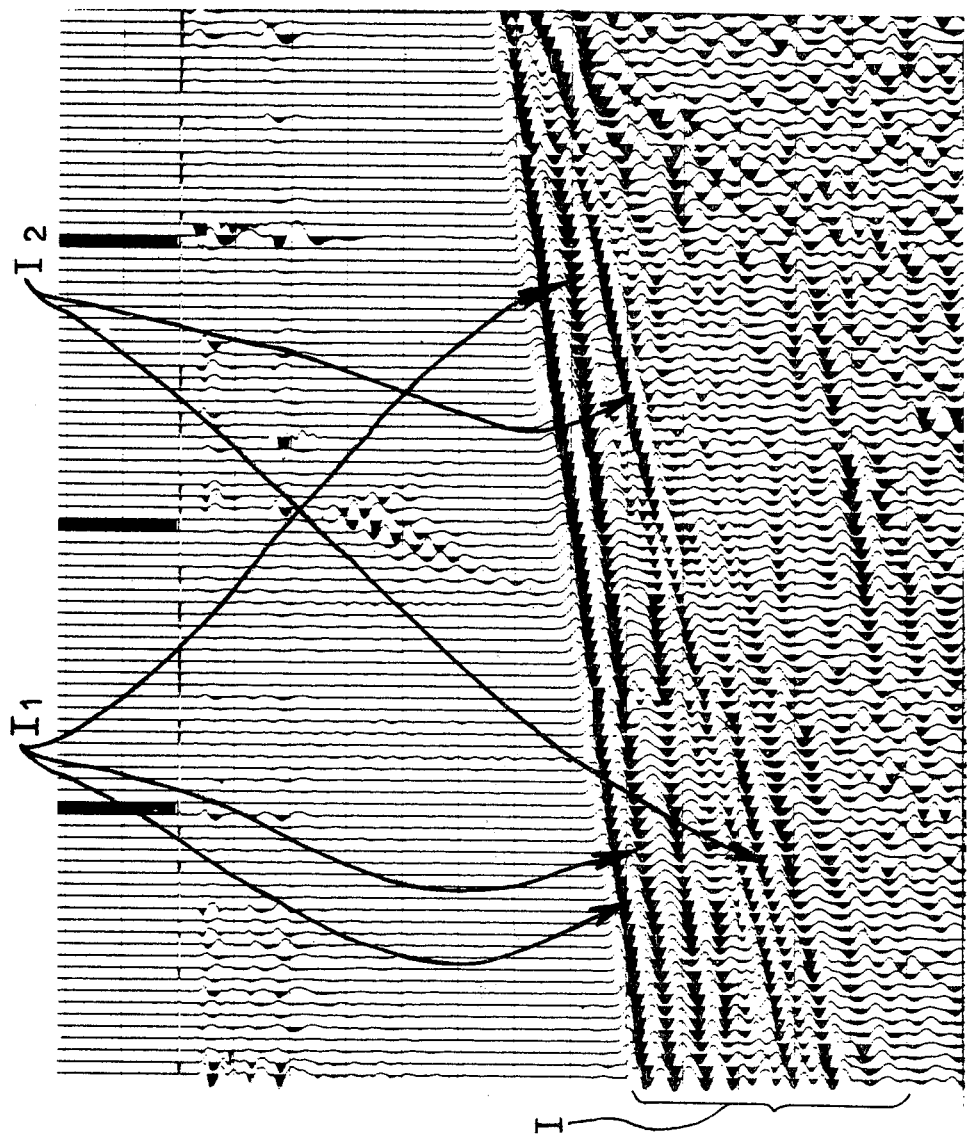
Figure 6B:
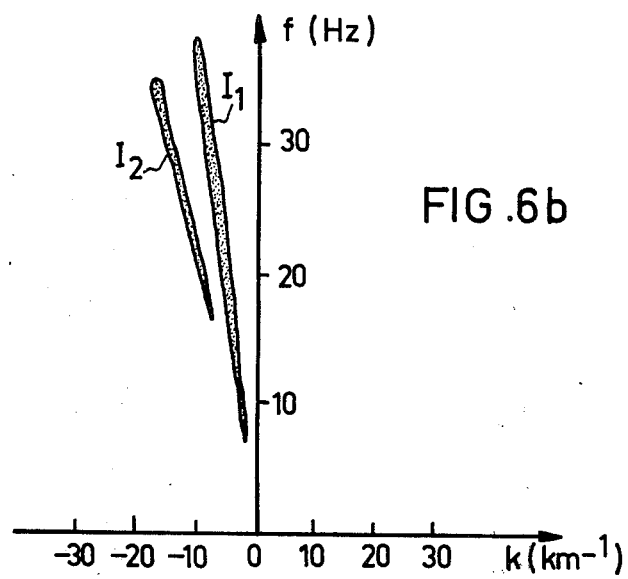

FIGS. 6a and 6b show, respectively, the portion of a recording obtained by the same means as those defined in relation to FIG. 1, said figure illustrating also the seismic refraction phenomenon, as well as the diagram of its time-spaced spectre.

Figure 7D:
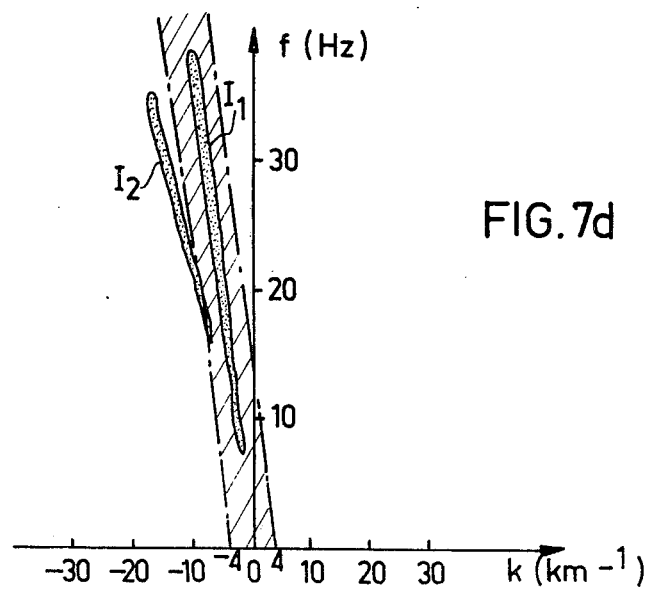
Figure 7B:
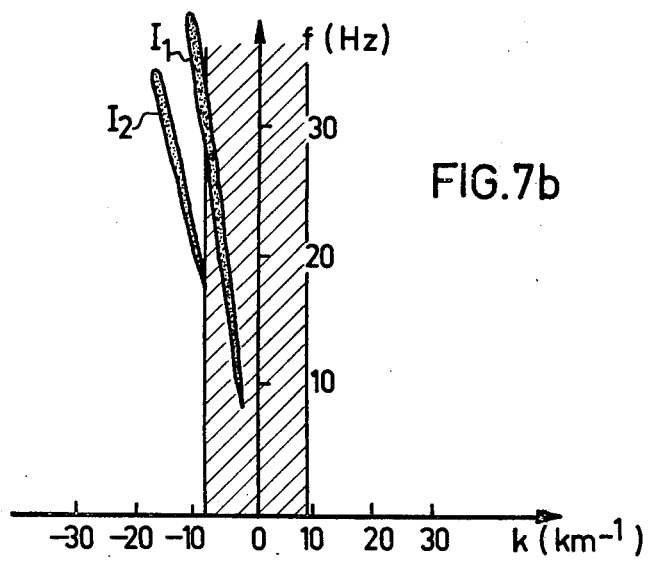
Figure 7A:
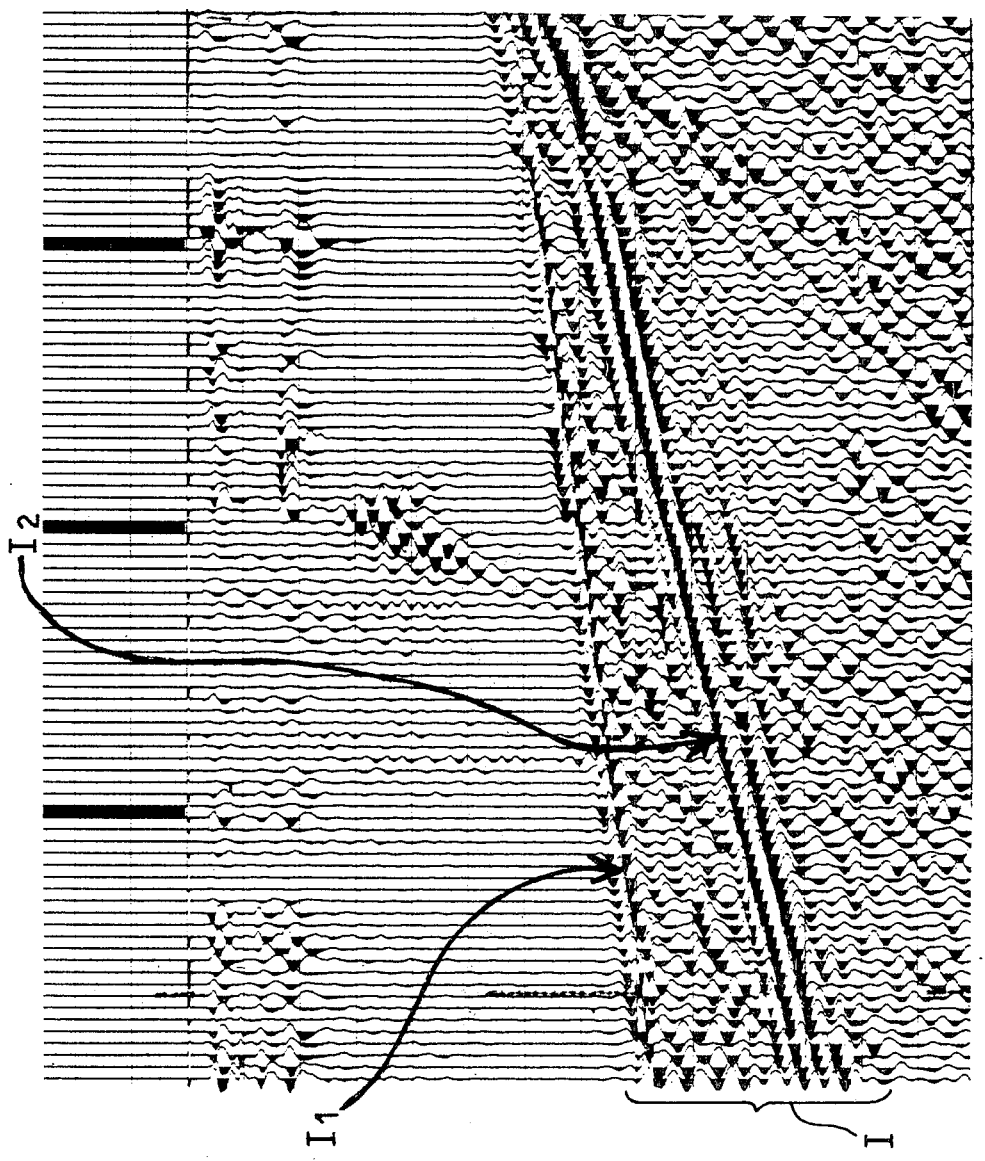
Figure 7C:
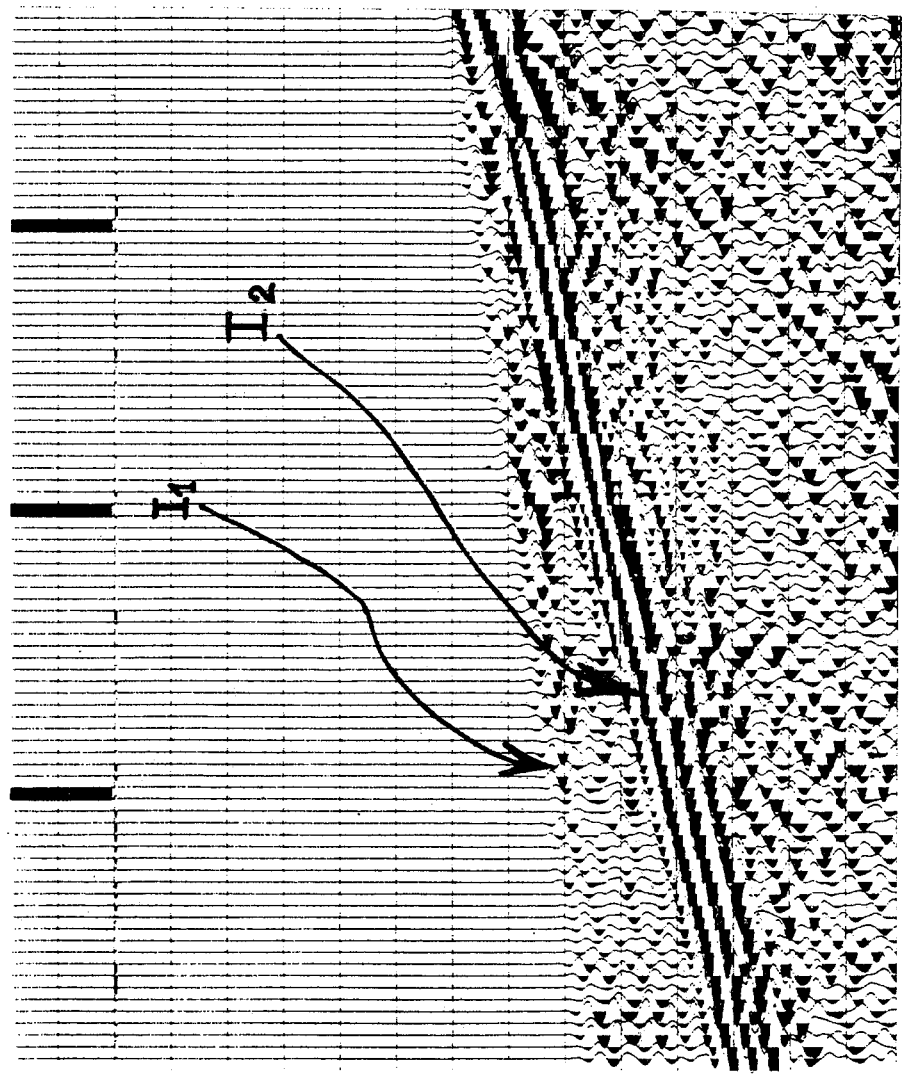

FIGS. 7a and 7c show, respectively, the effects of the filters indicated on FIGS. 7b and 7d, and the portion of the seismogram represented by FIG. 6a.

Figure 8:
Figure 8A:
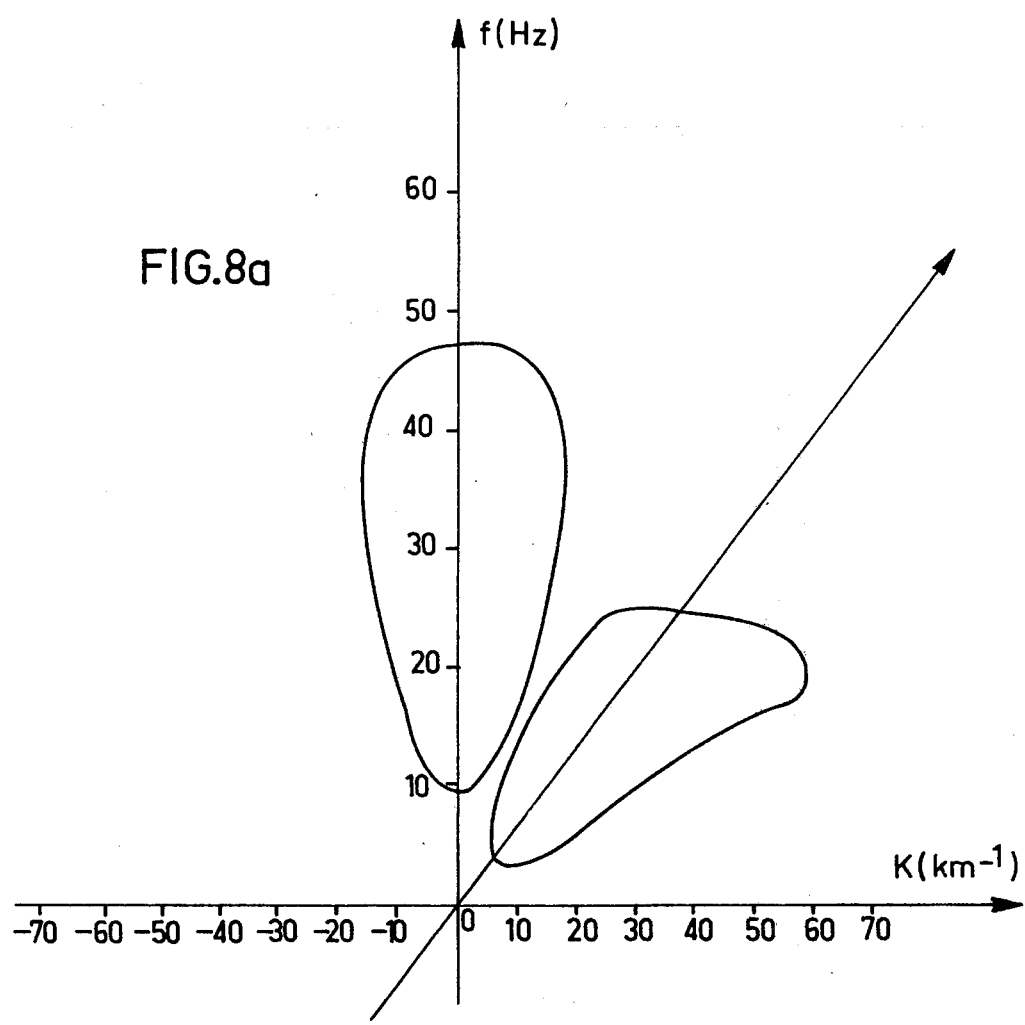
Figure 8B:
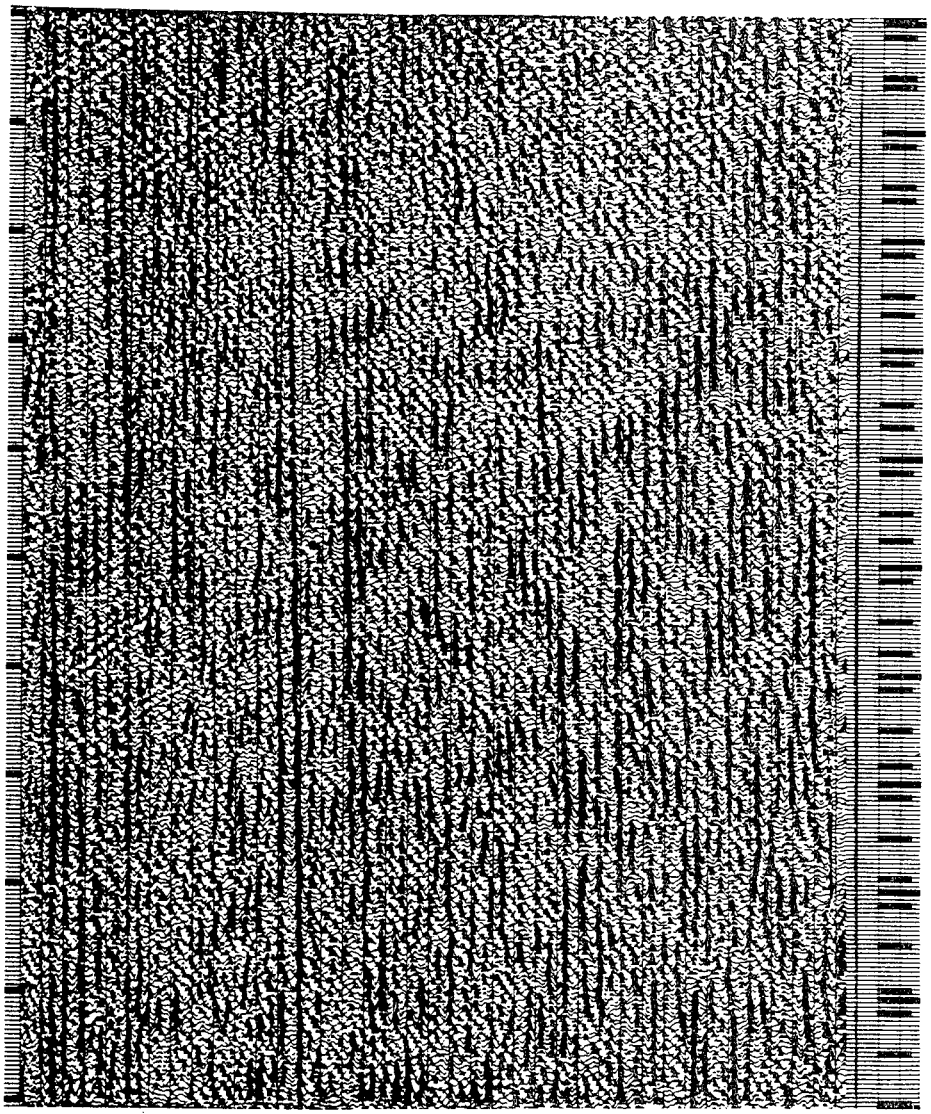
Figure 8C:
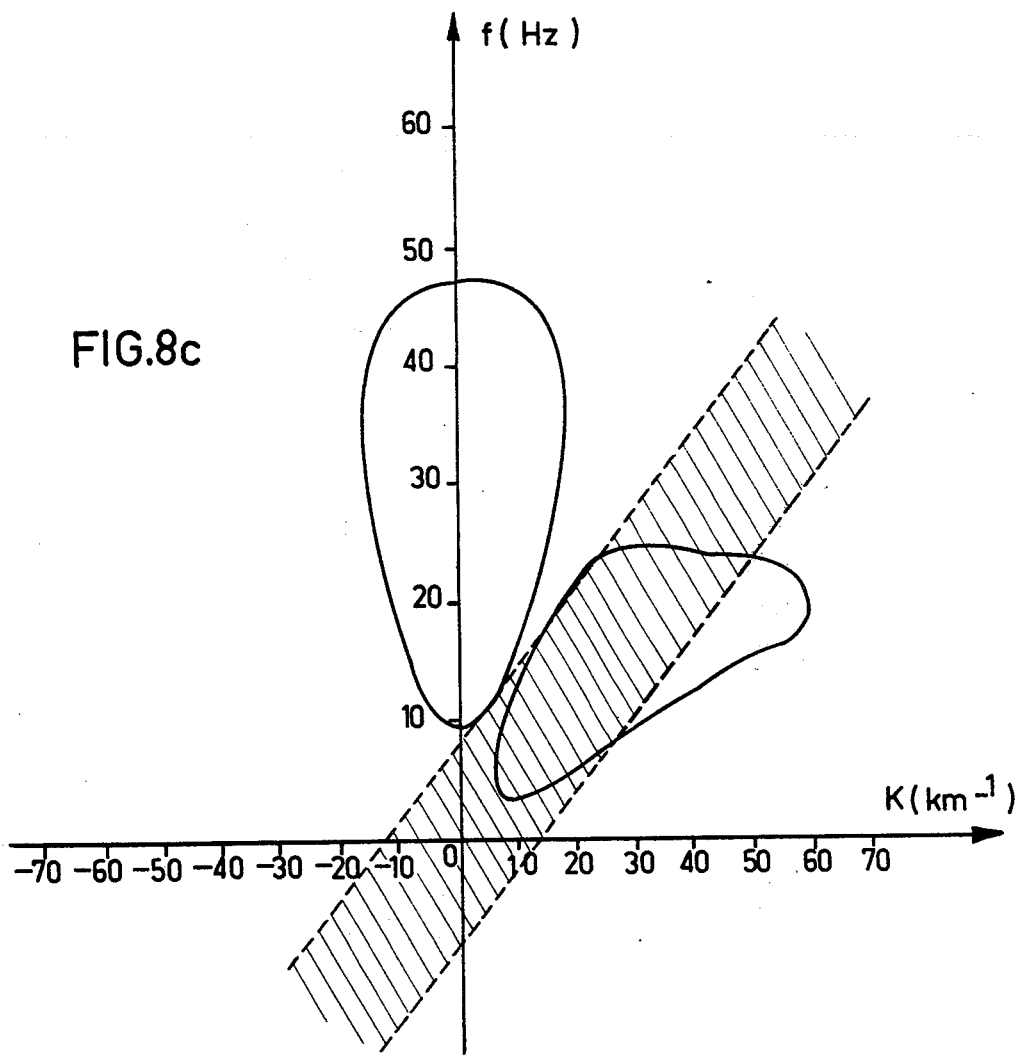

FIGS. 8 and 8a show, respectively, a seismic section obtained immediately after filtering by the method of treatment indicated on FIG. 2c, and the diagram of its bidimensional spectre, while FIG. 8b shows the result of the application of $k, f$ filtering (method according to FIG. 2g) to the seismic section of FIG. 8, as diagrammatically shown in FIG. 8c.

Figure 9:
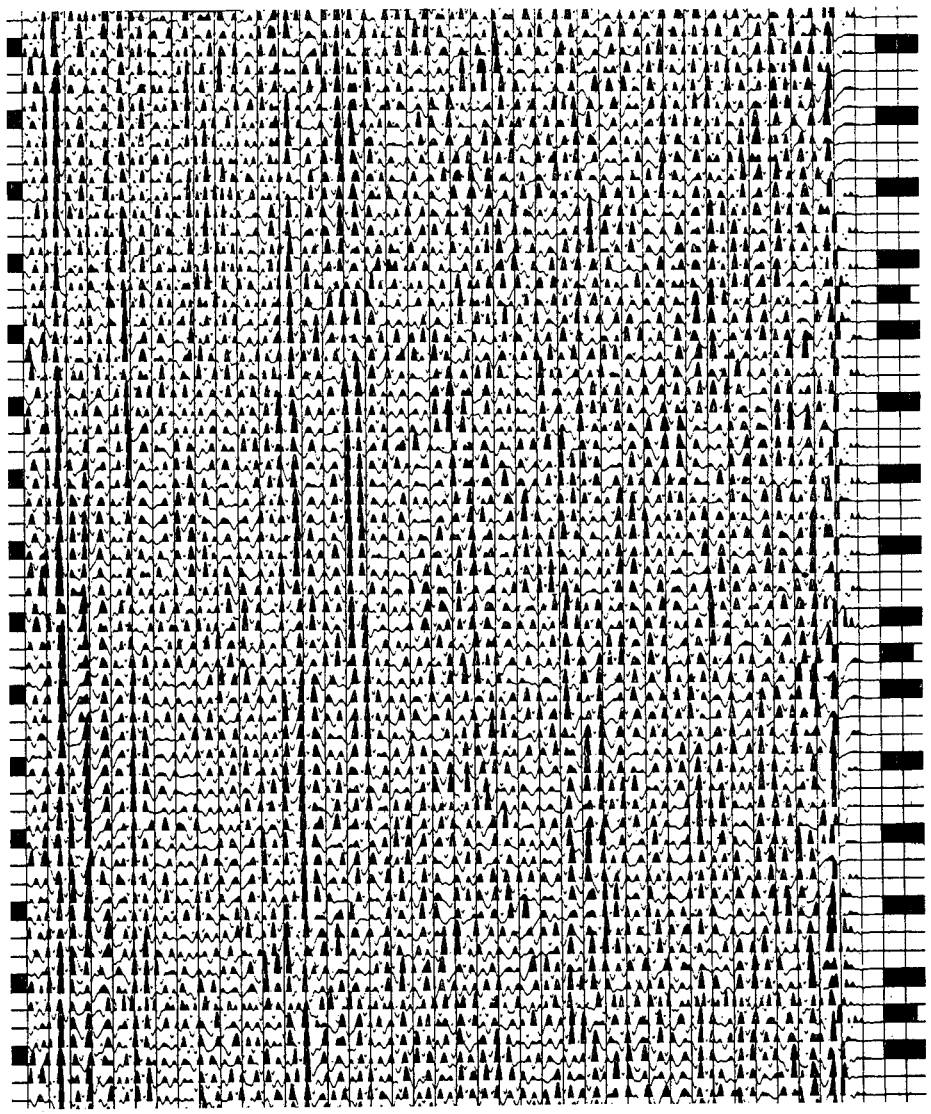

FIG. 9 shows, for comparison, the seismic section corresponding to the same portion of profile which is shown in FIG. 8b, but relating to a space filtering in accordance with the prior art utilizing geometrical devices on the soil, each one of said devices comprising two rows of 9 seismographs spaced 5 meters apart, the distance between the traces (i.e. the distance between the centers of any two adjacent devices) being equal to 40 m (i.e. a distance substantially greater than the inverse of twice the maximum space frequency of the recorded wave).

As shown in FIG. 1, an emission source E which is constituted in the present embodiment by an explosive charge, is placed in a cavity B provided at a given point of the zone to be surveyed, the explosion of said charge being initiated by a control box D through a conductor C connected to the detonator placed in said charge. On the surface of the soil of the zone to be surveyed are arranged a number of receiving devices, said number being 216 in the instant embodiment, which receiving devices are aligned on a straight line which passes through the emission point, while the distance between any two adjacent seismographs is 10 meters. With a view to simplifying the drawing, FIG. 1 shows only the two seismographs R1 and R 216 arranged at the respective ends of the row of seismographs and the intermediary seismograph R 108 of row 108. The detonator and the various seismographs R1 to R 216 are connected to a recording device P by lines $L_D$ and $L_1$ to $L_{216}$, respectively. The recordings provided by said recording device are then transmitted to a treatment unit T wherein said recordings are treated so as to produce a diagram CS representing the seismic section of the surveyed profile.

The explosion of charge E initiated by means of control box D generates acoustic waves which are propagated in the soil, certain of said waves being reflected by the reflecting areas J and J' (constituted by interfaces between geological layers of different constitution or composition) at the mirror or depth points $M_1 \ldots , M_{108} \ldots , M_{216}$ for interface J and at the mirror points $M_1 \ldots , M_{108} \ldots ; M_{216}$ for the interface J'. The waves reflected at mirror points or depth points $M_1$ and $N_1$ are received by seismograph $R_1$, the waves reflected by mirror or depth points $M_{108}$ and $N_{108}$ are received by seismograph $R_{108}$, whereas seismograph $R_{216}$ receives the waves reflected at mirror or depth points $M_{216}$ and $N_{216}$. Furthermore, each one of seismographs $R_1$ to $R_{216}$ receives the organized noises which are generated by the explosion of charge E and which are propagated more or less directly from the emission point towards the seismographs. The signals produced by the various seismographs pass through amplifiers (not shown) and are then transmitted by corresponding lines $L_1$ to $L_{216}$ to the recording device P where said signals are recorded simultaneously and separately. The operation of the recording device is initiated by the signal transmitted by the detonator to said recording device through line LD, when said detonator initiates the explosion of the above-mentioned explosive charge. The recording device provides an initial or "raw" seismogram comprising 216 juxtaposed traces each one represent the amplitude of the signal produced by the corresponding seismograph, said amplitude being represented as a fuction of time. The raw seismogram is then submitted in the treatment unit to a treatment with a view to elaborating the seismic section, which treatment comprises, in addition to the known operations, a treatment in accordance with the instant invention, which is related to the space frequency and more particularly the said treatment comprises a space filtering which may advantageously be combined with a time filtering.

Figure 2D:
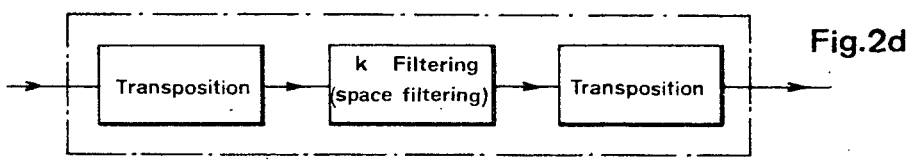
FIGS. 2 to 2g are diagramatic views of various methods of treatment of the recorded reflected seismic waves.

The treatment of the "raw" seismograms provided by the recording device for various emission cycles is more particularly shown in FIGS. 2 to 2c, whereas FIGS. 2d to 2g represent the method which is applied to effect the $k$ filtering (space or wave number filtering), or the combined $k$ and $f$ filtering (frequency filtering) in accordance with the present invention.

As shown in FIG. 2 time traces of the raw seismogram provided by the recording device are submitted to static corrections whereafter on the thus corrected seismograms, after determination of the space frequencies or the spectre of the space and time frequencies of the seismogram a $k$ filtering a $k$ and $f$ filtering or a $k$, $f$ filtering is carried out with a view to eliminating the parasitic phenomena, especially with a view to eliminating the organised noises, the wave numbers and frequencies of which are dtermined by analysis of said spectres.

Figure 2E:
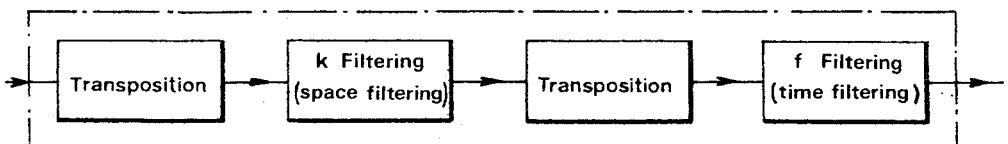
Figure 2F:
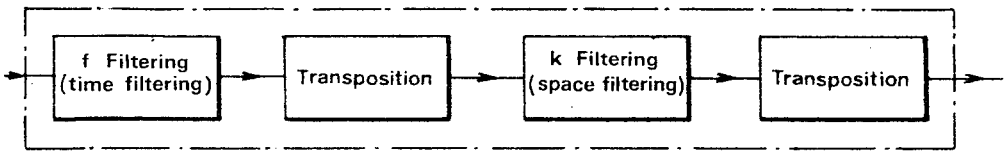
Figure 2G:
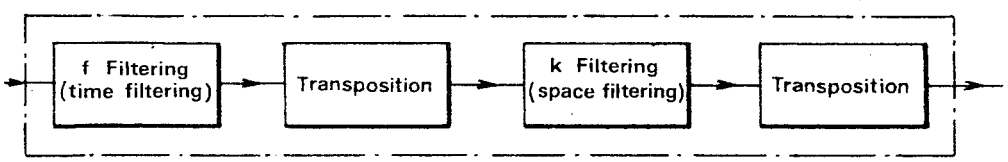

As shown in FIGS. 2d to 2f, the $k$ filtering involves first of all a transformation of the time traces of the seismogram into space traces, prior to effecting the filtering operation proper. After the $k$ filtering the filtered space traces are transformed, in turn, to time traces, so as to reconstitute the conventional time recording. The seismograms may also be submitted to a time filtering or $f$ filtering, which may be effected prior to a space filtering, as indicated on FIG. 2f, or after said space filtering, as shown in FIG. 2e. It is also possible to submit the seismograph obtained after static correction to a direct $k$, $f$ filtering as schematically indicated in FIG. 2g; in this case the "fan filtering" or a so-called directional "band section" space-time filtering method may be applied.

On the basis of the $k$ filtered, or $k$ and $f$ filtered recordings a graph currently called "trace collection in common depth point" is established by juxtaposing the time traces produced by different emissions on the same seismic profile and corresponding to common depth points, or "mirror" points (multiple coverage method). The traces of this graph are submitted to the well-known velocity analysis and dynamic correction operations with a view to put the indicatrices of the reflections into a horizontal position and consequently to put the signals associated to the reflections in proper phase coincidence.

The dynamically corrected traces are then stacked and the resulting stacked traces are assembled so as to constitute the final multiple coverage section which is also called "time section."

In another embodiment according to FIG. 2a, the raw seismograms provided by the recording device undergo static corrections, whereafter the trace collections in common depth points are established on the basis of the thus corrected seismograms; these trace collections being then submitted to velocity analysis operations and to dynamic correction, and the dynamically corrected seismograph are then established. Thereafter the space frequency spectres, the time frequency spectres or the space time frequency spectres of the dynamically corrected seismograms are determined whereafter said seismograms are submitted to $k$ filtering or $k$ and $f$ filtering, according to the results of the analysis of said spectres. On the basis of the dynamically corrected and $k$ filtered or $k$ and $f$ filtered, or $k$, $f$ filtered seismograms the trace collections in common depth point are constituted. The traces of each one of said collections are then stacked and the different stacked traces are assembled to constitute the final multiple coverage section.

In the embodiment schematically indicated in FIG. 2b, which is applied when the coverage is statistically great, the trace collections in common depth point are established on the basis of seismograms which have been submitted to static corrections, and said trace collections are submitted to velocity analysis and dynamic correction. The space frequency spectres (wave number spectres) or the space frequency and time frequency spectres of the dynamically corrected trace collections in common depth point are then determined, and the appropriate $k$ filterings, $k$ and $f$ filterings or $k, f$ filterings are effected on said trace collections. The traces of each collection in common depth points which have been filtered and dynamically corrected are then stacked and the different stacked traces thus obtained are assembled so as to establish the final multiple coverage section.

In the embodiment shown in FIG. 2c the wave number spectres or the wave number and frequency spectres of the dyanamically corrected trace collections obtained as described hereinabove with reference to FIG. 2b are determined, whereafter $k$ filtering, $k$ and $f$ filtering or $k, f$ filtering is effected, in accordance with the results of the analysis of said spectres, on the multiple coverage section obtained on the basis of the stacked traces of the dynamically trace collections in common depth point.

The seismogram shown in FIG. 3 which is provided by the recording device as a result of the explosion of a charge, i.e. for one emission cycle, comprises 216 vertically juxtaposed and regularly spaced traces. The length of each trace corresponds to a recording or receiving time of 5 seconds, while the distance between any two adjacent traces corresponds to a distance of 10 meters between any two adjacent seismographs arranged on the soil.

This seismogram shows the dromochronical zone, or superficial refraction zone (I) a zone (II) where the organized noises generated by the explosion are predominating, various reflections (III) which are easily distinguished when they are located outside of the zone of the organized noises, said reflections being however, substantially masked within said zone.

The wave number spectres indicated in FIG. 3a which are the average spectres computed on time windows of approximately 600 milliseconds and on space traces of 216 samples (to this end 2500 space traces have been stabliehed for the complete seismogram, utilizing a sampling module equal to 2 milliseconds) show a maximum for wave numbers approaching zero, which correspond to the reflections, and to maximum values which are more or less co-related for wave numbers comprised between 8 and 25 km$^{-1}$, corresponding to the superficial refractions and to the organized noises.

The spectre $(k, f)$, of the seismogram schematically shown in FIG. 3b also shows a zone I corresponding to the zone of superficial refractions, a zone II corresponding to the organised noises for wave number and frequency values comprised, respectively, between 8 and 25 km$^{-1}$ and between 5 and 18 hertz, as well as a zone III corresponding to the refraction for wave number and frequency values comprised, respectively between 0 and 6 km$^{-1}$, and between about 10 and 35 hertz.

The analysis of these spectres shows that it is possible to attenuate the organized noises appearing on the seismogram of FIG. 3 by submitting said seismogram to a wave number filtering of the "low-pass" type utilizing a "low-pass" space filter which has a shut-off wave number of approximately 10km$^{-1}$. This space filtering may be completed by a time filtering utilizing a time filtering method of the "high-pass" type with a time filter allowing frequencies higher than 12 hertz to pass.

The seismogram of FIG. 4a shows the result of the wave number low-pass filtering indicated on FIG. 4b, which filtering is carried out by means of a low-pass filter having a shut-off wave number of 10km$^{-1}$. The coherence of the noises which appeared in zone II of the seismogram of FIG. 3 is substantially deteriorated so that it becomes possible to follow more safely the reflections (III) in that zone, for instance the reflections III.1 and III.2 which were substantially masked by said organised noises in zone II of the seismogram of FIG. 3.

FIG. 4c illustrates the effect of a high pass frequency filtering effected on the seismogram which has previously been $k$ filtered (seismogram of FIG. 4a), this double filtering being represented in FIG. 4d. With a view to carrying out the frequency filtering a high-pass filter is utilized which allows frequencies higher than 12 hertz to pass. The effect of the frequency filtering is considerable, as evidenced by the comparison of the seismogram of FIGS. 3 and 4c, and it results from the separation, on the spectre (FIG. 4d), of the areas related to zones II (organized noises) and III (reflections) of the seismogram of FIG. 3, which separation leads to an improvment of the reflections (III) especially in zone II which is perturbed by the organized noises. This frequency filtering the effects of which are added to the effects of the wave number filtering permits to show more clearly the reflections than a simple $k$ filtering, especially in zone II comprising the organized noises. However, the result shown in FIGS. 4a and 4c are affected by the narrow filtering constituted by the low-pass $k$ filtering operation. It has been noted in practice, and confirmed theoretically, that it is preferable to filter only the undesirable events (II), rather than to retain only the interesting events.

FIG. 4e shows the advantageous effects of the directional "band-section" filtering schematically indicated in FIG. 4f and carried out directly on the seismogram of FIG. 3.

FIG. 5a shows the seismogram obtained by wave number filtering of the seismogram of FIG. 3 by means of the filter shown in FIG. 5b which is complementary to the filter shown in FIG. 4b. This seismogram shows not only the surface waves or organized noises of zone (II) of the seismogram of FIG. 3, which are designated by (II$_1$), but also noises which appear to be symmetrical with respect to the above-mentioned ones, as related to the reflections represented by the various levels of zone (III) and which are designated by (II$_2$). As every noise appearing on the seismogram of FIG. 5a is supposed to be filtered on the seismogram of FIG. 4a this shows the efficiency of the filtering carried out by means of the filter schematiccaly illustrated in FIG. 4b.

In a similar manner, by effecting on the seismogram of FIG. 3 two filtering operations by means of the wave number and frequency filters showns in FIG. 5d, which are complementary to the filters shown in FIG. 4d, the seismogram illustrated in FIG. 5c is obtained which seismogram comprises the noises of the seismogram of FIG. 5a and, in addition, the noises the frequencies of which are comprised between 0 and 12 hertz and the wave numbers of which are comprised between 0 and 10km$^{-1}$.

This also evidences the above-mentioned advantage (FIG. 4c) of completing the space filtering by a time filtering with a view to showing more clearly the reflections on the seismogram.

The filtering complementary to the filtering shown in FIG. 4f, as schematically indicated in FIG. 5f, produces a seismogram shown in FIG. 5e which comprises the noises filtered by 4f and thus illustrates the efficiency of the filter. In addition to the effect of the filter which can be seen on the seismograms of FIGS. 4a and 5e the comparison of FIGS. 5a and 5e shows that on the seismogram of FIG. 4e the effects of the undesirable events of type ($II_2$) must subsist. However these events, as well as those which may subsist after the first directional "band-section" filtering illustrated in FIG. 4f may be filtered by the same means as those described hereinabove, provided that the azimuth of the direction of the filter and the band with of the same are conveniently choosen.

The recording shown in FIG. 6a shows in the superficial refraction zone I two arriving refracted waves, namely a first refracted wave $I_1$ of high energy and a second refracted wave $I_2$ with which the repetitions of the first refracted wave interfere.

The space time spectre of this recording represented on FIG. 6b shows that a separation of the two received refracted waves is possible by a space or space time filtering, and that when a high-pass wave number filtering according to FIG. 7b (space filtering which allows the wave numbers higher than about $8km^{-1}$ to pass) or a directional "band-section" filtering according to FIG. 7d is effected, the refracted wave received in the second place may be isolated.

FIGS. 7a and 7c which show the recordings obtained after filtering illustrate that the above mentioned filtering operations have considerably attenuated the refracted wave $I_1$ received in the first place, and have still more substantially attenuated the repetitions thereof. The refracted wave received in the second place thus becomes more easily exploitable.

The seismic section represented in FIG. 8 comprises 240 traces of a seismic test profile obtained on the basis of a multiple coverage method (one emission source aligned with a row of receiving devices, and establishment of a plurality of successive emission cycles, so that the receiving devices overlap between the successive cycles) and on the basis of a treatment according to the embodiment schematically indicated in FIG. 2c, said treatment leading to the establishment of the multiple coverage seismic section immediately prior to the $k, f$ filtering. This multiple coverage seismic section is submitted to a direction "band-section" filtering the parameters of which have been determined on the basis of an analysis of the bi-dimensional spectre which is schematically illustrated in FIG. 8a, and the effect of which, as shown in FIG. 8c, is substantiated by the filtered seismic section shown in FIG. 8b.

Furthermore, the comparison of FIG. 8b and FIG. 9 showing the prior art (low density of the seismic traces per length unit and space filtering effected on the soil) shows that a better definition of the seismic events which are of interest is obtained when the method in accordance with the instant invention is applied (high density of the seismic traces per unit of length, and space or space time filtering of the seismogram during the treatment leading to the establishment of the seismic section), said method according to the invention permitting adapting the filtering parameters (azimuth and band width along a profile or during a study, and, if desired, decomposing the survey into a plurality of elementary operations), with a view to obtaining an optimum filtering and to improving the continuity of the seismic events to be surveyed. While particular embodiments of the present invention have been shown and described hereinabove, it will be appreciated by those skilled in the art that other equivalent techniques may be suggested. The appended claims cover all such changes and modifications and are deemed to define the true scope of the instant invention.

What is claimed is:

1. A method of seismic surveying of a given medium comprising the steps of:

aligning a multiplicity of substantially punctual receiving devices in the vicinity of the surface of the medium to by surveyed each receiving device comprising at least one geophone, the number of geophones being sufficient to provide adequate surface coupling;

spacing the receiving devices so that the distance between any two adjacent receiving devices is not greater than the reciprocal of twice the maximum space frequency of the waves to be detected;

emitting mechanical waves into said medium by transmitting successive energy pulses from an emission source associated with the receiving devices;

detecting independently and simultaneously on the receiving devices the waves transmitted through the medium and recording for the various positions of the receiving devices signals comprising at least 100 seismic traces representing the variations of amplitude of the detected waves as a function of time said step of recording including individually recording the output of each of said receiving devices, the recorded traces including surface waves and organized noise from a majority of the receiving devices;

forming a seismogram including at least about 100 of such traces with an interval between any two consecutive traces corresponding to a distance in the medium not greater than the reciprocal of twice the maximum space frequency of the waves to be detected; and treating the seismogram thus formed to produce a seismic section therefrom, said treatment including analyzing the seismogram and submitting the seismogram to filtering to remove the space frequencies corresponding to undesired phenomena, the characteristics of the applied filter being determined from the analysis of the space time frequency characteristics of the seismogram so that removal of the space frequencies is effected primarily during the step of treating the seismogram.

2. A method according to claim 1, wherein said step of forming a seismogram comprising at least 100 traces includes associating elementary seismograms with a smaller number of traces.

3. A method according to claim 1, wherein said step of forming a seismogram having at least 100 traces includes using a number of receiving devices equal to the number of traces of the seismogram to be formed.

4. A method according to claim 1, wherein said step of aligning the receiving devices comprises aligning the receiving devices along a straight line passing through the point of transmission of waves from the emission source into the medium.

5. A method according to claim 1, wherein the traces of the seismogram having at least 100 traces are obtained by a multiple coverage method.

6. A method according to claim 1 further comprising submitting the seismogram or trace collections to dynamic corrections in common depth point wherein the analyzing and the filtering are performed after dynamic correction at common depth point.

7. A method according to claim 6 wherein the traces of the seismogram are obtained by a multiple coverage method, and the step of filtering is on a seismic multiple coverage section of the dynamically corrected trace collections.

8. A method according to claim 7, wherein an analysis of the velocity precedes the dynamic corrections of the traces of the seismogram and is carried out in the spatial domain by effecting the spectral analysis of the traces of the spatial domain which are obtained on the basis of the seismogram prior to any dynamic correction, and during the application of increasing dynamic data, while retaining the velocities for which the amplitude spectres of the corrected space traces show a trend toward a sine function.

9. A method according to claim 7, wherein a velocity analysis preceding the dynamic corrections is carried out by the spectral analysis of the space functions obtained on the basis of the trace collections in common depth point for a great coverage value, and by retaining the velocities for which the amplitude spectres of the corrected traces of said trace collection tend to show the form of a sine function.

10. A method according to claim 1, wherein the step of analyzing includes analyzing the space frequency characteristics of said seismogram, producing the space time frequency spectres of said seismogram and therefrom determining the space time frequencies of the undesired phenomena.

11. A method according to claim 1, comprising the steps of constituting two seismograms each comprising at least 100 traces, the interval between any two consecutive traces corresponding to a distance on the soil not greater than the inverse of twice the maximum space frequency of the waves to be recorded, and corresponding to two survey directions defining a predetermined angle, then treating the corresponding seismograms to provide two seismic sections each of which is located in the vertical plane passing through the corresponding survey direction; locating in space the depth points corresponding to the minimum duration trace by defining said depth points by means of their coordinates in the system of axis formed by said survey directions and the vertical axis which is perpendicular to said survey direction, while utilizing the information provided by said seismic sections.

12. A method according to claim 11, wherein said two seismograms are obtained by utilizing a punctual emission source associated with two rows of receiving devices each one of which comprises at least 100 receiving devices with an interval between any two consecutive receiving devices not greater than the inverse of twice the maximum space frequency of the waves to be recorded, the respective directions of said rows of receiving devices passing through the emission point and constituting said survey directions.

13. A method according to claim 1, wherein the distance between any two adjacent receiving devices of the plurality of receiving devices is not greater than 10 meters.

14. A method according to claim 1, wherein the space or space time frequencies of the seismogram corresponding to the received refracted waves are determined, and wherein said seismogram is filtered for eliminating from its space or space time frequencies those frequencies which correspond to the successively received waves on the seismogram, starting from the first arrived waves.

15. A method according to claim 1, wherein said step of treating includes one directional space time band rejection filtering and wherein the azimuth and band width of the applied filter are determined.

16. A method of seismic surveying of a given medium comprising the steps of:
aligning a plurality of substantially punctual emission sources in the vicinity of the surface of the medium to be surveyed each emission source comprising at least one wave generator;
spacing the emission sources so that the distance between any two adjacent emission sources is not greater than the reciprocal of twice the maximum space frequency of the waves to be detected;
emitting mechanical waves into said medium by transmitting successive energy pulses from said emission sources to an associated receiving device;
detecting successively on the receiving device the waves transmitted through the medium and corresponding to each of the emission sources, and recording for the various positions of the emission sources signals comprising at least about 100 seismic traces representing the variations of amplitude of the detected waves as a function of time;
forming a seismogram including at least about 100 of such traces with an interval between any two consecutive traces corresponding to a distance in the medium not greater than the reciprocal of twice the maximum space frequency of the waves to be detected; and
treating the seismogram thus formed to produce a seismic section therefrom, said treatment including analyzing the seismogram and submitting said seismogram to filtering to remove the space frequencies corresponding to undesired phenomena, the characteristics of the applied filter being determined from the analysis of the space time frequency characteristics of the seismogram so that removal of the space frequencies is effected primarily during the step of treating the seismogram.

17. A method according to claim 16, wherein said step of forming a seismogram comprising at least 100 traces includes associating elementary seismograms with a smaller number of traces.

18. A method according to claim 16, wherein said step of forming a seismogram having at least 100 traces includes using a number of emission sources equal to the number of traces of the seismogram to be formed.

19. A method according to claim 16, wherein said step of aligning the emission sources comprises aligning the emission sources along a straight line passing through the point of reception of waves by the receiver device from the medium.

20. A method according to claim 16, wherein the traces of the seismogram having at least 100 traces are obtained by a multiple coverage method.

21. A method according to claim 16, further comprising submitting the seismogram or trace collections to dynamic corrections in common depth point wherein the analyzing and the filtering are performed after dynamic correction at common depth point.

22. A method according to claim 21 wherein the traces of the seismogram are obtained by a multiple coverage method, and the step of filtering is on a seismic multiple coverage section of the dynamically corrected trace collections.

23. A method according to claim 21, wherein an analysis of the velocity precedes the dynamic corrections of the traces of the seismogram and is carried out in the spatial domain by effecting the spectral analysis of the traces of the spatial domain which are obtained on the basis of the seismogram prior to any dynamic correction, and during the application of increasing dynamic data, while retaining the velocities for which the amplitude spectres of the corrected space traces show a trend toward a sine function.

24. A method according to claim 21, wherein a velocity analysis preceding the dynamic corrections is carried out by the spectral analysis of the space functions obtained on the basis of the trace collections in common depth point for a great coverage value, and by retaining the velocities for which the amplitude spectres of the corrected traces of said trace collection tend to show the form of a sine function.

25. A method according to claim 16, wherein the step of analyzing the space frequency characteristics of said seismogram includes producing the space time frequency spectres of said seismogram and therefrom determining the space time frequencies of the undesired phenomena.

26. A method according to claim 16, comprising the steps of constituting two seismograms each comprising at least 100 traces, the interval between any two consecutive traces corresponding to a distance on the soil not greater than the inverse of twice the maximum space frequency of the waves to be recorded, and corresponding to two survey directions defining a predetermined angle, then treating the corresponding seismograms to provide two seismic sections each of which is located in the vertical plane passing through the corresponding to the minimum duration trace by defining said depth points by means of their co-ordinates in the system of axis formed by said survey directions and the vertical axis which is perpendicular to said survey direction, while utilizing the information provided by said seismic sections.

27. A method according to claim 26, wherein said two seismograms are obtained by utilizing a punctual receiving device associated with two rows of emission sources each row of which comprises at least 100 emission sources with an interval between any two consecutive emission sources with an interval between any two consecutive emission sources not greater than the reciprocal of twice the maximum space frequency of the waves to be recorded, the respective directions of said rows of emission sources passing through the receivng point and constituting said survey directions.

28. A method according to claim 16, wherein the distance between any two adjacent emission sources of the plurality of emission sources is not greater than 10 meters.

29. A method according to claim 16, wherein the step of treating includes determining the space or space time frequencies of the seismogram corresponding to the received refracted waves, and wherein said seismogram is filtered for eliminating from its space or space time frequencies those frequencies which correspond to the successively received waves on the seismogram, starting from the first arrived waves.

30. A method according to claim 16 wherein said step of treating includes one directional space time band rejection filtering and wherein the azimuth and band width of the applied filter are determined.

* * * * *